(12) United States Patent
Watanabe

(10) Patent No.: US 8,954,057 B2
(45) Date of Patent: Feb. 10, 2015

(54) BASE STATION, DETECTION DEVICE, COMMUNICATION SYSTEM AND DETECTION METHOD

(75) Inventor: Teruyoshi Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/267,907

(22) Filed: Oct. 7, 2011

(65) Prior Publication Data

US 2012/0108231 A1      May 3, 2012

(30) Foreign Application Priority Data

Nov. 2, 2010   (JP) ................. 2010-246256

(51) Int. Cl.
*H04W 24/00* (2009.01)
*H04W 24/08* (2009.01)
*H04L 12/24* (2006.01)
*H04L 12/26* (2006.01)

(52) U.S. Cl.
CPC .............. *H04W 24/08* (2013.01); *H04L 41/06* (2013.01); *H04L 43/0817* (2013.01); *H04L 43/0852* (2013.01)
USPC .......................................... 455/424; 455/561

(58) Field of Classification Search
CPC . H04L 41/06; H04L 43/0852; H04L 43/0817; H04W 24/08
USPC ........... 455/423–425, 561, 453; 370/235–238
See application file for complete search history.

(56) References Cited

U.S. PATENT DOCUMENTS

| | | | | |
|---|---|---|---|---|
| 6,138,019 | A | * | 10/2000 | Trompower et al. .......... 455/436 |
| 2008/0117829 | A1 | * | 5/2008 | Nakano et al. ................ 370/247 |
| 2009/0003215 | A1 | * | 1/2009 | Wang et al. ................ 370/236.1 |
| 2013/0217382 | A1 | | 8/2013 | Kudo |

FOREIGN PATENT DOCUMENTS

| | | | |
|---|---|---|---|
| JP | 2008-219359 | 9/2008 | |
| JP | 2010-119053 | 5/2010 | |
| JP | 2012-95145 A | 5/2012 | |
| SE | WO 02/51181 A1 * | 6/2002 | ............... H04Q 7/22 |

* cited by examiner

*Primary Examiner* — Vladimir Magloire
(74) *Attorney, Agent, or Firm* — Arent Fox LLP

(57) ABSTRACT

A base station includes: an interface that transfers user data; a processor that controls the base station in accordance with a process including: obtaining a period of time from when a transfer unit receives the user data to when the interface transmits the user data; and detecting an abnormality in the interface based on the period of time.

19 Claims, 26 Drawing Sheets

FIG. 10

| USER | DOWNLINK DATA | | UPLINK DATA | |
|---|---|---|---|---|
| | RECEPTION POINT OF TIME FROM HWIF | TRANSMISSION POINT OF TIME TO TRX | RECEPTION POINT OF TIME FROM TRX | TRANSMISSION POINT OF TIME TO HWIF |
| 1 | aa:aa | aa:bb | aa:cc | aa:dd |
| 2 | bb:aa | bb:bb | bb:cc | bb:dd |
| 3 | cc:aa | cc:bb | cc:cc | cc:dd |

FIG. 11

| USER | DOWNLINK DATA | | UPLINK DATA | |
|---|---|---|---|---|
| | RECEPTION POINT OF TIME FROM OTHER NODE | TRANSMISSION POINT OF TIME TO BB | RECEPTION POINT OF TIME FROM BB | TRANSMISSION POINT OF TIME TO OTHER NODE |
| 1 | AA:AA | AA:BB | AA:CC | AA:DD |
| 2 | BB:AA | BB:BB | BB:CC | BB:DD |
| 3 | CC:AA | CC:BB | CC:CC | CC:DD |

FIG. 12

| USER | BB PROCESSING TIME | | HWIF PROCESSING TIME | |
|---|---|---|---|---|
| | DOWNLINK DATA | UPLINK DATA | DOWNLINK DATA | UPLINK DATA |
| 1 | a1 | b1 | c1 | d1 |
| 2 | a2 | b2 | c2 | d2 |
| 3 | a3 | b3 | c3 | d3 |
| INDEX VALUE | A | B | C | D |

FIG. 18

| USER | BB PROCESSING TIME | | HWIF PROCESSING TIME | |
|---|---|---|---|---|
| | DOWNLINK DATA | UPLINK DATA | DOWNLINK DATA | UPLINK DATA |
| 1 | a1 | b1 | c1 | d1 |
| 2 | a2 | b2 | c2 | d2 |
| 3 | a3 | b3 | c3 | d3 |

FIG. 19

| USER | DOWNLINK DATA<br>RECEPTION POINT OF<br>TIME FROM OTHER NODE | UPLINK DATA<br>TRANSMISSION POINT OF<br>TIME TO OTHER NODE |
|---|---|---|
| 1 | AA:AA | AA:DD |
| 2 | BB:AA | BB:DD |
| 3 | CC:AA | CC:DD |

FIG. 20

| USER | DOWNLINK DATA TRANSMISSION POINT OF TIME TO eNB | UPLINK DATA RECEPTION POINT OF TIME FROM eNB |
|---|---|---|
| 1 | EE:EE | EE:HH |
| 2 | FF:EE | FF:HH |
| 3 | GG:EE | GG:HH |

FIG. 21

| USER | BB PROCESSING TIME | | HW/F PROCESSING TIME | | TRANSMISSION INTERVAL | |
|---|---|---|---|---|---|---|
| | DOWNLINK DATA | UPLINK DATA | DOWNLINK DATA | UPLINK DATA | DOWNLINK DATA | UPLINK DATA |
| 1 | a1 | b1 | c1 | d1 | e1 | f1 |
| 2 | a2 | b2 | c2 | d2 | e2 | f2 |
| 3 | a3 | b3 | c3 | d3 | e3 | f3 |
| INDEX VALUE | A | B | C | D | E | F |

| Octets | 8 | 7 | 6 | 5 | 4 | 3 | 2 | 1 |
|---|---|---|---|---|---|---|---|---|
| 1 | Version | | | PT | (*) | E | S | PN |
| 2 | Message Type ||||||||
| 3 | Length ||||||||
| 4 | Length ||||||||
| 5 | Tunnel Endpoint Identifier ||||||||
| 6 | Tunnel Endpoint Identifier ||||||||
| 7 | Tunnel Endpoint Identifier ||||||||
| 8 | Tunnel Endpoint Identifier ||||||||
| 9 | Sequence Number ||||||||
| 10 | Sequence Number ||||||||
| 11 | N-PDU Number ||||||||
| 12 | Next Extension Header Type ||||||||

2601 points to the (*) field. 2600 labels the overall structure.

BASE STATION, DETECTION DEVICE, COMMUNICATION SYSTEM AND DETECTION METHOD

CROSS-REFERENCE TO RELATED APPLICATION

This application is based upon and claims the benefit of priority of the prior Japanese Patent Application No. 2010-246256 filed on Nov. 2, 2010, the entire contents of which are incorporated herein by reference.

FIELD

The present disclosure relates to a base station, a detection device, a communication system, and a detection method.

BACKGROUND

In wireless mobile communication systems such as, for example, Long Term Evolution (LTE), communication is conducted by establishing interfaces between communication devices called an S1 interface and an X2 interface. The S1 interface is an interface established for connecting a wireless base station device and a host device that establish a wireless mobile communication system, by using an IP protocol, and for transferring C-plane and U-plane signals. The wireless base station device may be, for example, an evolutional Node-B (eNB). The host device may be, for example, a Serving Gateway (S-GW) or a Mobility Management Entity (MME).

The X2 interface is an interface established for connecting wireless base station devices by the IP protocol, and for transferring C-plane and U-plane signals. For example, when conducting a user equipment (UE) handover, the X2 interface transfers user data sent to the wireless base station device executing the handover from an S-GW or MME, to the wireless base station device receiving the handover.

An IP network and the like, may exhibit phenomena that affect host applications (such as Web access and the like), such as sudden increases in data transfer amounts (burst traffic occurrences) and transfer delays. Examples of causes leading to data transfer amount increases and transfer delays include the influx of data exceeding network processability limits into the network which strains the capabilities and capacities of network equipment included in edge nodes.

Further, when setting errors exist in network equipment (e.g., routers, switches, etc.) due to human error and the like, the expected performance of the network equipment cannot be obtained and thus reductions in performance such as transfer delays occur. Similarly, reductions in performance such as transfer delays may also occur due to breakdowns in network equipment or network equipment load increases due to the concentration of data in specialized network equipment, and the like.

Recently, the use of IP networks as network infrastructure has become common even in wireless mobile communication systems. Reductions in the performance of wireless mobile communication systems affect mobile telephone services that are applications conducted at the host level. Examples of mobile telephone services include sound communication and packet communication.

For example, when a reduction in performance occurs in an eNB, the completion rate of U-plane transfer processing is reduced and the data rate between wireless sections is reduced even though call processing (C-plane) is completed.

As a result, for example, a network administrator constantly monitors and maintains the network to avoid reductions in network performance.

SUMMARY

A base station includes: an interface that transfers user data; a processor that controls the base station in accordance with a process including: obtaining a period of time from when a transfer unit receives the user data to when the interface transmits the user data; and detecting an abnormality in the interface based on the period of time.

The object and advantages of the invention will be realized and attained by at least the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 illustrates an example of point of time information stored by a base band unit.
FIG. 11 illustrates an example of point of time information stored by a highway interface.
FIG. 12 illustrates an example of processing times calculated by a call processing unit.
FIG. 18 illustrates an example of processing times calculated by a call processing unit.
FIG. 19 illustrates an example of point of time information sent to a detection device by a base station.
FIG. 20 illustrates an example of point of time information sent to a detection device by another node.
FIG. 21 illustrates an example of processing and transfer times controlled by a detection device.

FIG. 26 illustrates an example of a GTP header.

DESCRIPTION OF EMBODIMENTS

In the abovementioned conventional art, an abnormality (for example, a transfer delay) occurring in a wireless base station device (for example, an eNB) that does not terminate user data cannot be detected. As a result, there is a problem in that it is difficult to identify the location of the occurrence of the abnormality.

For example, an eNB terminates a C-plane signal on the one hand, but does not terminate a U-plane signal. Specifically, although the eNB performs data exchange from a wired interface to a wireless interface, the eNB does not manage the delay or loss of data. Therefore, abnormalities cannot be detected by the eNB when monitoring the C-plane.

The U-plane signal terminal point may conduct monitoring of U-plane signals transmitted by a mobile station and the S-GW for the mobile station and S-GW, for example. However, it is difficult to identify whether the location of the abnormality is in the mobile station section, eNB section, or S-GW section when an abnormality occurs between the mobile station and the S-GW.

Moreover, a network that conducts sequential control and authorization response is a prerequisite for detecting a continuity state in, for example, the Japanese Laid-open Patent Application Publication No. 2010-119053. As a result, there is a problem in that the continuity state cannot be detected in a User Datagram Protocol (UDP) for example.

An object of the disclosed base station, detection device, communication system, and detection method is to accurately identify the location of a network abnormality and solve the above problems, for example.

At least in part to address the above problems with the technology disclosed herein, a base station includes a transfer unit, wherein the time from when the transfer unit that transmits user data receives the user data until the transfer unit transmits the user data is obtained, and then abnormalities are detected based on the obtained time.

The locations of network abnormalities can be accurately identified by the disclosed base station, detection device, communication system, and detection method.

Preferred embodiments of the disclosed techniques will be explained in detail below with reference to the accompanying drawings.

Embodiment 1

Communication System

Figure 1:
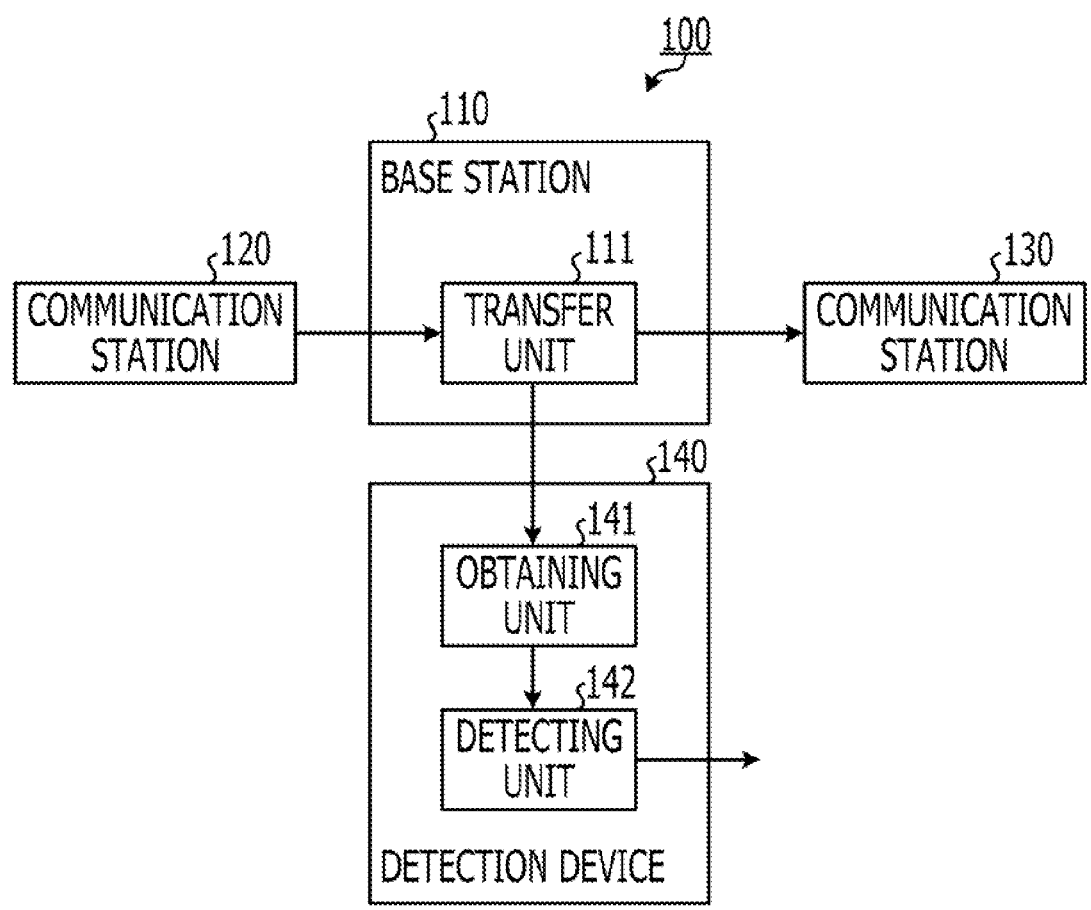
FIG. 1 illustrates a communication system according to a first embodiment.

FIG. 1 illustrates a communication system according to a first embodiment. As illustrated in FIG. 1, a communication system 100 according to the first embodiment includes a base station 110, communication stations 120 and 130, and a detection device 140. The communication system 100 is a communication system that transfers user data transmitted by the upstream communication station 120 to the downstream communication station 130 via the base station 110. User data is actual user data transmitted while the communication system 100 is operating.

The base station 110 is equipped with a transfer unit 111. The transfer unit 111 transfers data transmitted and received between mobile stations and a core network in a mobile communication system. Specifically, the transfer unit 111 receives user data transmitted by the upstream communication station 120 and transfers the received user data without terminating (for example, decoding) the data to the downstream communication station 130. Additionally, the transfer unit 111 transmits a user data reception point of time and transmission point of time to the detection device 140.

The communication station 120 is, for example, a mobile station, and the communication station 130 is another node connected to the base station 110. The other node is, for example, a communication station provided between the base station 110 and the core network. Specifically, the other node is an S-GW, an MME, or another base station (e.g., eNB) and the like. In this case, the transfer unit 111 transfers uplink data from the communication station 120 to the communication station 130.

Furthermore, the communication station 120 may be another node connected to the base station 110, and the communication station 130 may be a mobile station. In this case, the transfer unit 111 transfers downlink data from the communication station 120 to the communication station 130. Furthermore, the communication stations 120 and 130 may each be other nodes connected to the base station 110. In this case, the transfer unit 111 transfers uplink data or downlink data from the communication station 120 to the communication station 130.

The detection device 140 is equipped with an obtaining unit 141 and a detecting unit 142. The obtaining unit 141 obtains the period of time (hereinafter referred to as "processing time") from when the transfer unit 111 of the base station 110 receives user data until the transfer unit 111 transmits the user data. For example, the obtaining unit 141 obtains the user data processing time of the transfer unit 111 by calculating the difference between the reception point of time and the transmission point of time transmitted by the transfer unit 111. The obtaining unit 141 outputs the obtained processing time to the detecting unit 142.

The detecting unit 142 detects abnormalities of the transfer unit 111 (for example, transfer delays) based on the processing time outputted by the obtaining unit 141. The detecting unit 142 detects, for example, an abnormality of the transfer unit 111 based on results of comparing the processing time with an index value. Specifically, the detecting unit 142 determines that an abnormality occurred in the transfer unit 111 if the processing time exceeds a threshold value, and determines that an abnormality has not occurred in the transfer unit 111 if the processing time does not exceed the threshold value.

The detecting unit 142 outputs detection result information indicating the result of detecting an abnormality in the transfer unit 111. For example, the detecting unit 142 outputs the detection result to a user of the detection device 140. The detecting unit 142 may also transmit the detection result information to a communication device monitoring the base station 110.

Moreover, a control unit that controls the base station 110 based on the detection result information outputted by the detecting unit 142 may be provided in the base station 110 or the detection device 140. The control unit, for example, switches from the transfer unit 111 to a redundant path when an abnormality occurs in the transfer unit 111 if a redundant path that bypasses the transfer unit 111 to transfer user data from the communication station 120 to the communication station 130 exists. Additionally, the control unit may reboot the transfer unit 111 when an abnormality occurs therein.

Moreover, the user data transferred by the transfer unit 111 of the base station 110 may include a test flag that indicates whether the detection of abnormalities of the transfer unit 111 is actually being conducted or not. The transfer unit 111 transfers, to the detection device 140, the reception point of time and the transmission point of time of the user data that includes the test flag indicating that abnormality testing is being conducted (e.g., the flag is ON). Conversely, the transfer unit 111 transfers, to the detection device 140, the reception point of time and the transmission point of time of the user data that includes the test flag indicating that abnormality testing is not being conducted (e.g., the flag is OFF).

In this case, the obtaining unit 141 of the detection device 140 obtains the transfer unit 111 processing time for the user data that includes the test flag indicating that abnormality testing is being conducted, but does not obtain the transfer unit 111 processing time for the user data that includes the test flag indicating that abnormality testing is not being conducted. As a result, obtaining the transfer unit 111 processing time related to all the user data transferred by the transfer unit 111 can be avoided, thus suppressing any increase in the load on the detection device 140.

Although the above explanation describes a configuration in which the detection device 140 and the base station 110 are provided separately, the detection device 140 may also be provided in the base station 110. Moreover, the base station 110 may include multiple transfer units 111 and the detection device 140 may detect abnormalities in each of the multiple transfer units 111. Furthermore, the transfer unit 111 may include multiple circuits (e.g., a reception side circuit and a transmission side circuit) for transferring the user data, and the obtaining unit 141 may obtain the period of time from when the transfer unit 111 having multiple circuits receives the user data until the time the transfer unit 111 transmits the user data.

The transfer unit 111 of the base station 110 may be implemented, for example, by an arithmetic circuit such as a Digital Signal Processor (DSP), or by a communication interface. The obtaining unit 141 and the detecting unit 142 of the detection device 140 may be implemented by, for example, an arithmetic circuit such as a DSP.

Figure 2:
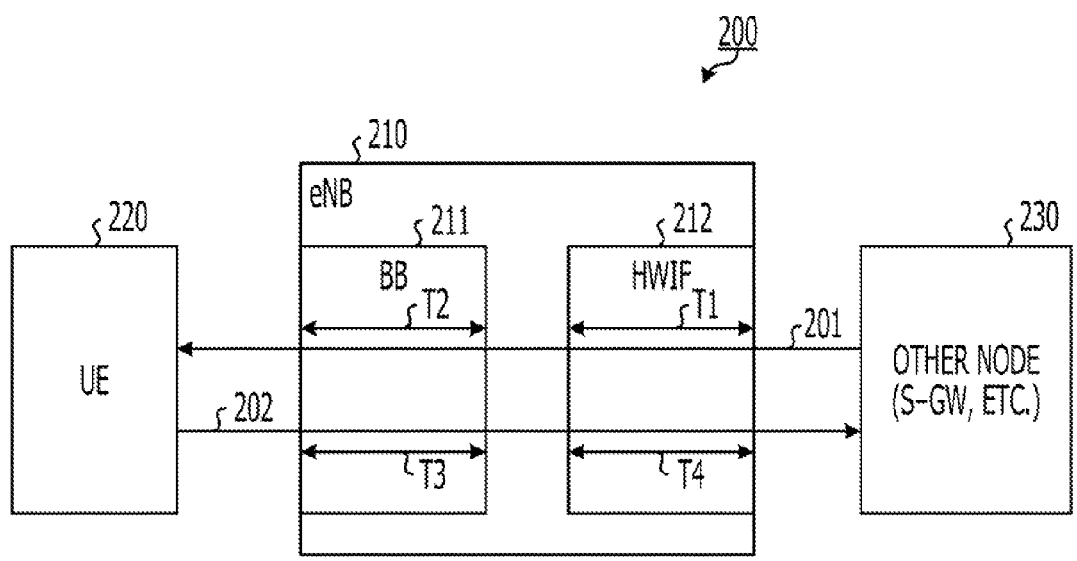
FIG. 2 illustrates a specific example of a communication system.

FIG. 2 illustrates a specific example of a communication system. A communication system 200 illustrated in FIG. 2 is a specific example of the communication system illustrated in FIG. 1. The communication system 200 is, for example, an LTE communication system. As illustrated in FIG. 2, the communication system 200 includes a base station 210 (eNB), a mobile station 220 (UE), and another node 230. The mobile station 220 is a mobile station that conducts wireless communication with the base station 210. The other node 230 may be an S-GW, an MME, or another base station.

The base station 210 is equipped with a base band unit (BB) 211 and a highway interface (HWIF) 212. The base band unit 211 and the highway interface 212 both correspond to the transfer unit 111 illustrated in FIG. 1. Moreover, the detection device 140 illustrated in FIG. 1 is provided, for example, in the base station 210.

The base station 210 relays (transfers) user data received and transmitted between the mobile station 220 and the other node 230 through the base band unit 211 and the highway interface 212. Downlink data 201 represents downlink data transmitted from the other node 230 to the mobile station 220. Uplink data 202 represents uplink data transmitted from the mobile station 220 to the other node 230.

The base band unit 211 and the highway interface 212 transfer the downlink data 201 received from the other node 230 to the mobile station 220. The other node 230 corresponds to the communication station 120 illustrated in FIG. 1, and the mobile station 220 corresponds to the communication station 130 illustrated in FIG. 1 in relation to the downlink data 201. The base band unit 211 and the highway interface 212 transfer the uplink data 202 received from the mobile station 220 to the other node 230. The mobile station 220 corresponds to the communication station 120 illustrated in FIG. 1, and the other node 230 corresponds to the communication station 130 illustrated in FIG. 1 in relation to the uplink data 202.

The obtaining unit 141 illustrated in FIG. 1 measures at least one of processing times T1 to T4. The processing time T1 represents the period of time from when the highway interface 212 receives the downlink data 201 from the other node 230 to when the highway interface 212 transmits the same to the base band unit 211. The processing time T2 represents the period of time from when the base band unit 211 receives the downlink data 201 from the highway interface 212 to when the base band unit 211 transmits the same to the mobile station 220.

The processing time T3 represents the period of time from when the base band unit 211 receives the uplink data 202 from the mobile station 220 to when the base band unit 211 transmits the same to the highway interface 212. The processing time T4 represents the period of time from when the highway interface 212 receives the uplink data 201 from the base band unit 211 to when the highway interface 212 transmits the same to the other node 230.

The detecting unit 142 illustrated in FIG. 1 detects abnormalities in the highway interface 212 based on the processing times T1 and T4 obtained by the obtaining unit 141. Additionally, the detecting unit 142 detects abnormalities in the base band unit 211 based on the processing times T2 and T3 obtained by the obtaining unit 141. In this way, the detecting unit 142 detects abnormalities in, for example, each transfer unit provided in the base station 210.

Specific Base Station Example

Figure 3:
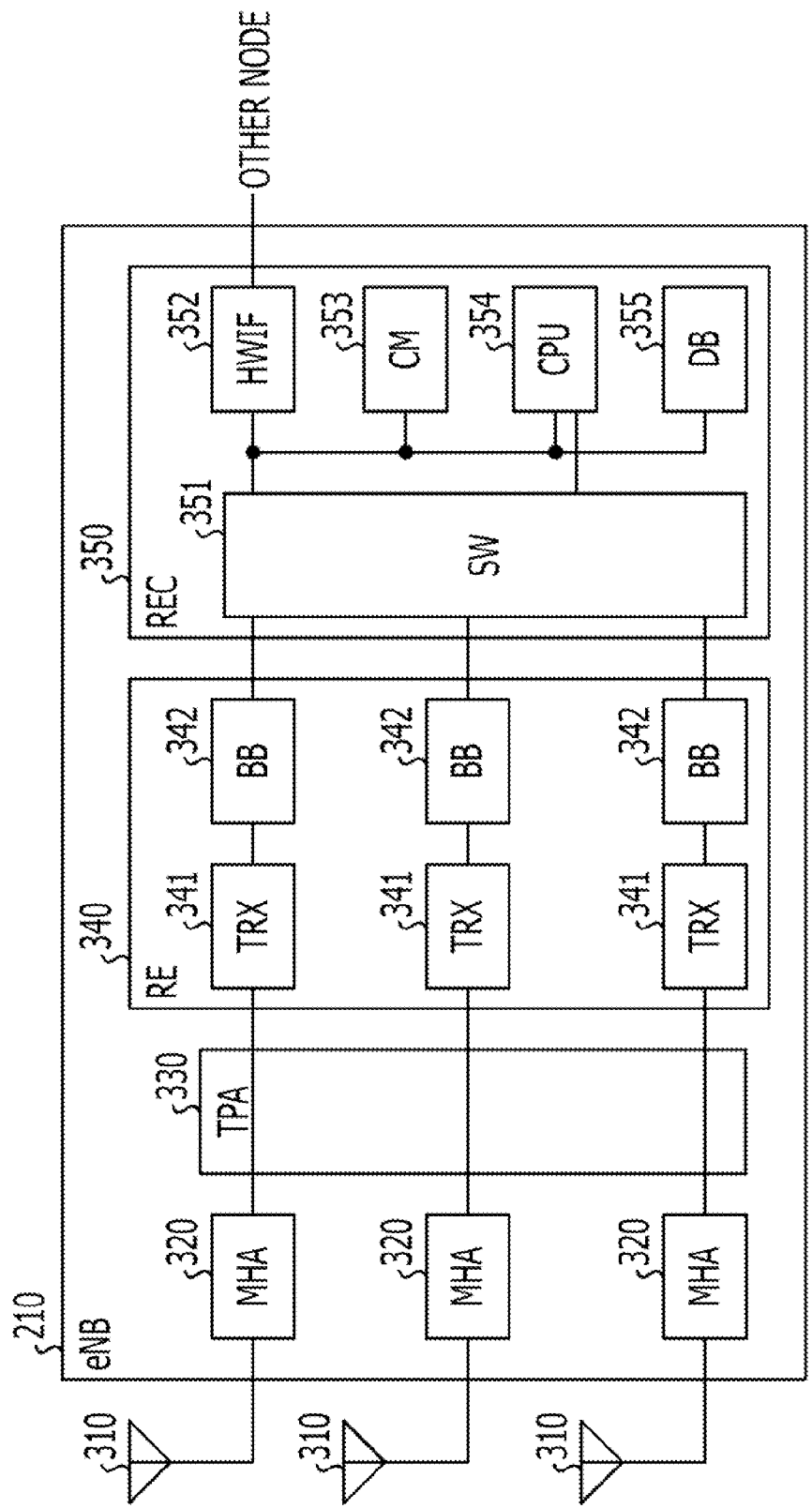
FIG. 3 illustrates a specific example of a base station.

FIG. 3 is a specific example of a base station. As illustrated in FIG. 3, the base station 210 is equipped with an antenna 310, a mast head amplifier (MHA) 320, a transmit power amplifier (TPA) 330, radio equipment (RE) 340, and a radio equipment controller (REC) 350.

The antenna 310 and the MHA 320 are provided in numbers corresponding to multiple sectors of the base station 210. The antennas 310 are wireless interfaces that transmit and receive wireless signals to and from the mobile station 220. The MHAs 320 amplify signals transmitted between the antennas 310 and the TPA 330. The TPA 330 amplifies signals transmitted between the MHAs 320 and the RE 340.

The RE 340 is equipped with a transmitter receiver (TRX) 341 and a base band unit (BB) 342. The TRX 341 and the BB 342 are provided in numbers that correspond to multiple sectors of the base station 210. The BB 342 corresponds to the base band unit 211 illustrated in FIG. 2.

The TRX 341 converts (up-conversion) the frequencies of baseband signals (downlink signals addressed to the mobile station 220) transmitted from the base band unit 342 to wireless frequencies and then transmits the signals to the TPA 330. Moreover, the TRX 341 converts (down conversion) the frequencies of wireless signals (uplink signals) received from the TPA 330 to baseband frequencies and then transmits the signals to the BB 342.

The BB 342 conducts baseband processing such as encoding and modulation on signals transmitted from a switch 351 of the REC 350, and then transmits the signals to the TRX 341. Additionally, the BB 342 conducts baseband processing such as demodulation and decoding on baseband signals received from the TRX 341, and then transmits the signals to the switch 351 of the REC 350.

The REC 350 is equipped with the switch 351 (SW), a highway interface 352 (HWIF), a common memory 353

(CM), a call processing unit 354 (CPU), and a database unit 355 (DB). The highway interface 352 corresponds to the highway interface 212 illustrated in FIG. 2. The CPU 354 corresponds to the detection device 140 illustrated in FIG. 1.

The switch 351 is controlled by the CPU 354 to switch the connections between the BBs 342 and the HWIF 352. Specifically, the switch 351 conducts at least one of outputting signals from the BB 342 to the HWIF 352 and outputting signals from the HWIF 352 to the BB 342.

The HWIF 352 functions as an S1 interface or an X2 interface and communicates with the other node 230. For example, the HWIF 352 includes a transmitting function that transmits control plane signals via the S1 and the X2 interfaces. Moreover, the HWIF 352 includes a receiving function that receives control plane signals via the S1 and the X2 interfaces.

The CM 353 stores user data based on operations by the CPU 354. For example, the DB 355 data may be read out and expanded to the CM 353. Additionally, time information and processing times obtained by the highway interface 352 may also be stored in the CM 353.

The CPU 354 controls the switch 351 based on data stored in at least one of the CM 353 and the DB 355, and transfers signals transmitted between the mobile station 220 and the other node 230 on suitable paths. Application data and setting data and the like for call control, for example, is included in at least one of the CM 353 and the DB 355.

The DB 355 stores data required for the operations of the base station 210. Information for managing the establishment and release associations with other base stations is also registered in the DB 355. For example, association numbers, endpoints used by the base station 210, sender/receiver port numbers (SCTP parameters), base station 210 IP addresses, and the IP addresses of other nodes 230 are registered in the DB 355.

The above explanation describes a configuration in which multiple antennas 310, MHAs 320, TRXs 341, and BBs 342 are provided in correspondence with multiple sectors. However, a configuration in which one of each of the antenna 310, the MHA 320, the TRX 341, and the BB 342 is provided is also possible.

Figure 4:
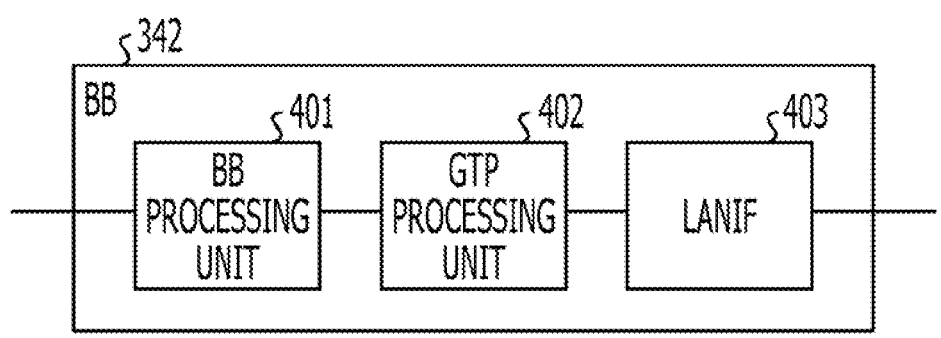
FIG. 4 illustrates a specific example of a base band unit.

FIG. 4 is a specific example of a base band unit. As illustrated in FIG. 4, the base band unit 342 is equipped with a BB processing unit 401, a GTP processing unit 402, and a LAN interface 403. The BB processing unit 401 conducts baseband processing of signals transmitted between the TRX 341 (see FIG. 3) and the GTP processing unit 402.

The GTP processing unit 402 conducts packet transfer processing using the GPRS Tunneling Protocol (GTP). Specifically, The GTP processing unit 402 transmits and receives signals to and from the TRX 341 via the BB processing unit 401. Additionally, the GTP processing unit 402 transmits and receives signals to and from the REC 350 via the LAN interface 403. The LAN interface 403 is an interface connected to the REC 350.

Figure 5:
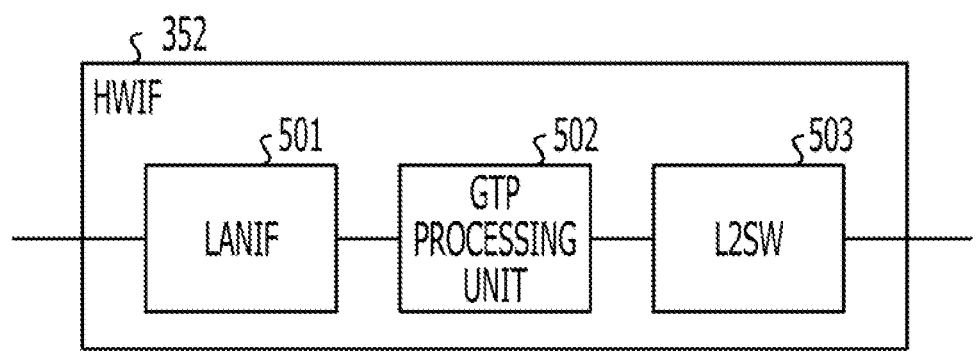
FIG. 5 illustrates a specific example of a highway interface.

FIG. 5 illustrates a specific example of a highway interface. As illustrated in FIG. 5, the highway interface 352 is equipped with a LAN interface 501, a GTP processing unit 502, and an L2 switch 503 (L2SW: Layer 2 Switch). The LAN interface 501 is an interface connected to the REC 350. The GTP processing unit 502 conducts packet transfer processing using GTP. Specifically, the GTP processing unit 502 transmits and receives signals to and from the REC 350 via the LAN interface 501. Additionally, the GTP processing unit 502 transmits and receives signals to and from the other node 230 via the L2 switch 503.

Other Node Specific Example

Figure 6:
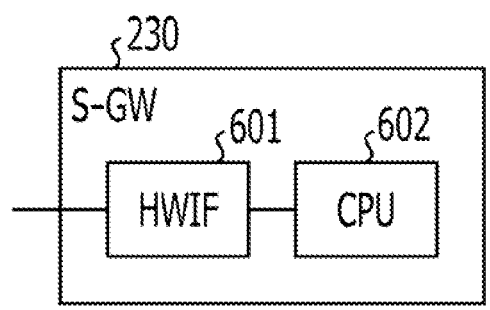
FIG. 6 illustrates a specific example of another node.

FIG. 6 is a specific example of another node. When the other node 230 is an S-GW, the other node 230 is equipped with a highway interface 601 (HWIF), and a call processing unit 602 (CPU) as illustrated in FIG. 6. The highway interface 601 is an interface connected to the base station 210. The call processing unit 602 conducts call processing with the base station 210.

Unit Processing Examples

Figure 7:
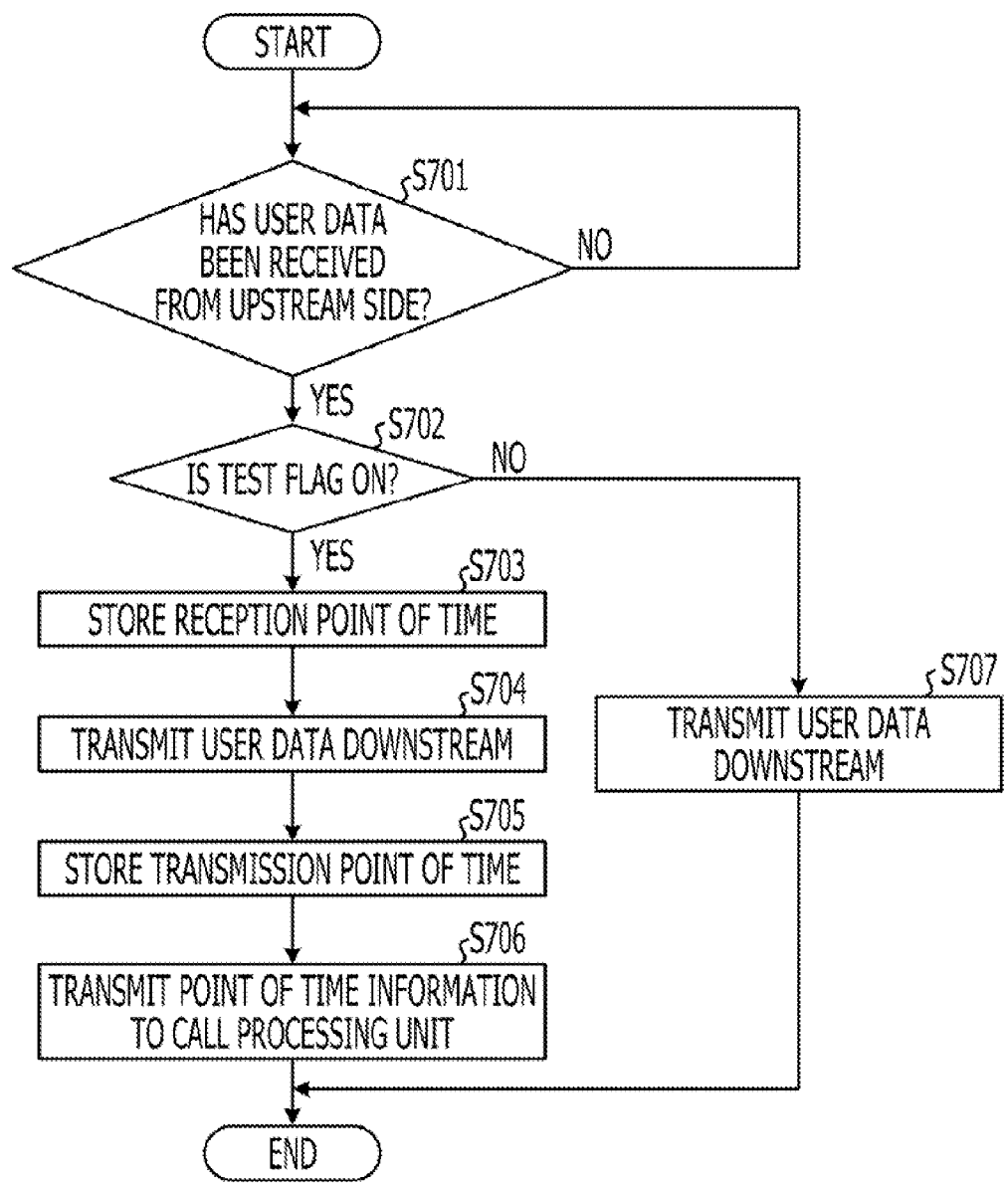
FIG. 7 is a flowchart illustrating an example of base band unit and highway interface processing.

FIG. 7 is a flowchart illustrating an example of base band unit and highway interface processing. Although the following explanation describes processing conducted by the base band unit 342, processing by the highway interface 352 is similar. The base band unit 342, for example, repeatedly performs the following steps.

To begin, the base band unit 342 determines whether or not user data (downlink and/or uplink data) has been received from the upstream side (step S701), or waits until the user data is received (step S701: No loop). When the user data is received (step S701: Yes), the base band unit 342 determines whether or not a test flag included in the received user data is ON (step S702). If the test flag is ON (step S702: Yes), the base band unit 342 stores the reception point of time of the user data from step S701 in a memory (step S703).

The base band unit 342 then transmits the user data received in step S701 downstream (step S704). The base band unit 342 then stores the user data transmission point of time from step S704 in the memory (step S705). The base band unit 342 then transmits time information indicating the points of time (the reception point of time and the transmission point of time) stored in steps S703 and S705 to the call processing unit 354 (step S706), thus ending the series of steps.

If the test flag is not ON in step S702 (step S702: No), the base band unit 342 transmits the user data received in step S701 downstream (step S707), thus ending the series of steps.

The above explanation described the case of transmitting point of time information to the call processing unit 354 for each transfer of user data. However, transmitting the point of time information is not limited to this timing. For example, the base band unit 342 may accumulate the reception and transmission points of time of individual user data transfers and then transmit the point of time information indicating the accumulated reception and transmission points of time at a certain timing.

Figure 8:
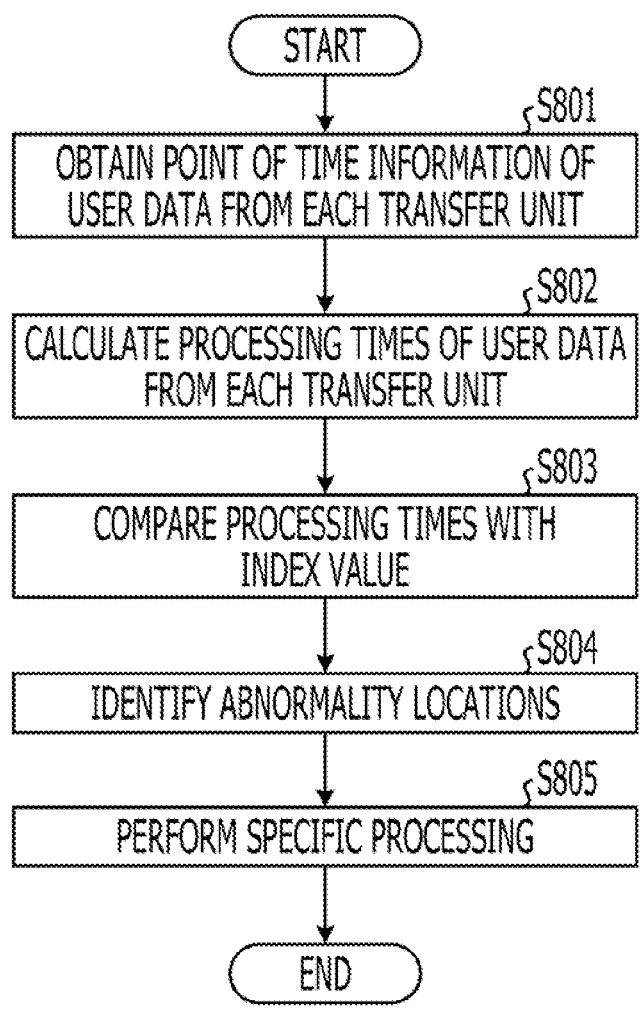
FIG. 8 is a flowchart illustrating an example of call processing unit processing.

FIG. 8 is a flowchart illustrating an example of call processing unit processing. To begin, the call processing unit 354 obtains the point of time information for the user data from each of the transfer units (step S801). The transfer units may be, for example, the base band unit 342 and the highway interface 352.

The call processing unit 354 then calculates the processing times of the user data from each transfer unit based on the point of time information obtained in step S801 (step S802). Specifically, the call processing unit 354 calculates the processing time by subtracting the reception point of time indicated in the time information from the transmission point of time indicated in the point of time information.

The call processing unit 354 then compares each of the processing times calculated in step S802 with an index value (step S803). The call processing unit 354 then identifies abnormality locations in the base band unit 342 and the highway interface 352 based on the comparison results from step S803 (step S804). The call processing unit 354 then performs specific processing in regard to the abnormality locations identified in step S804 (step S805), thus ending the series of steps.

Communication System Operation Example

Figure 9:
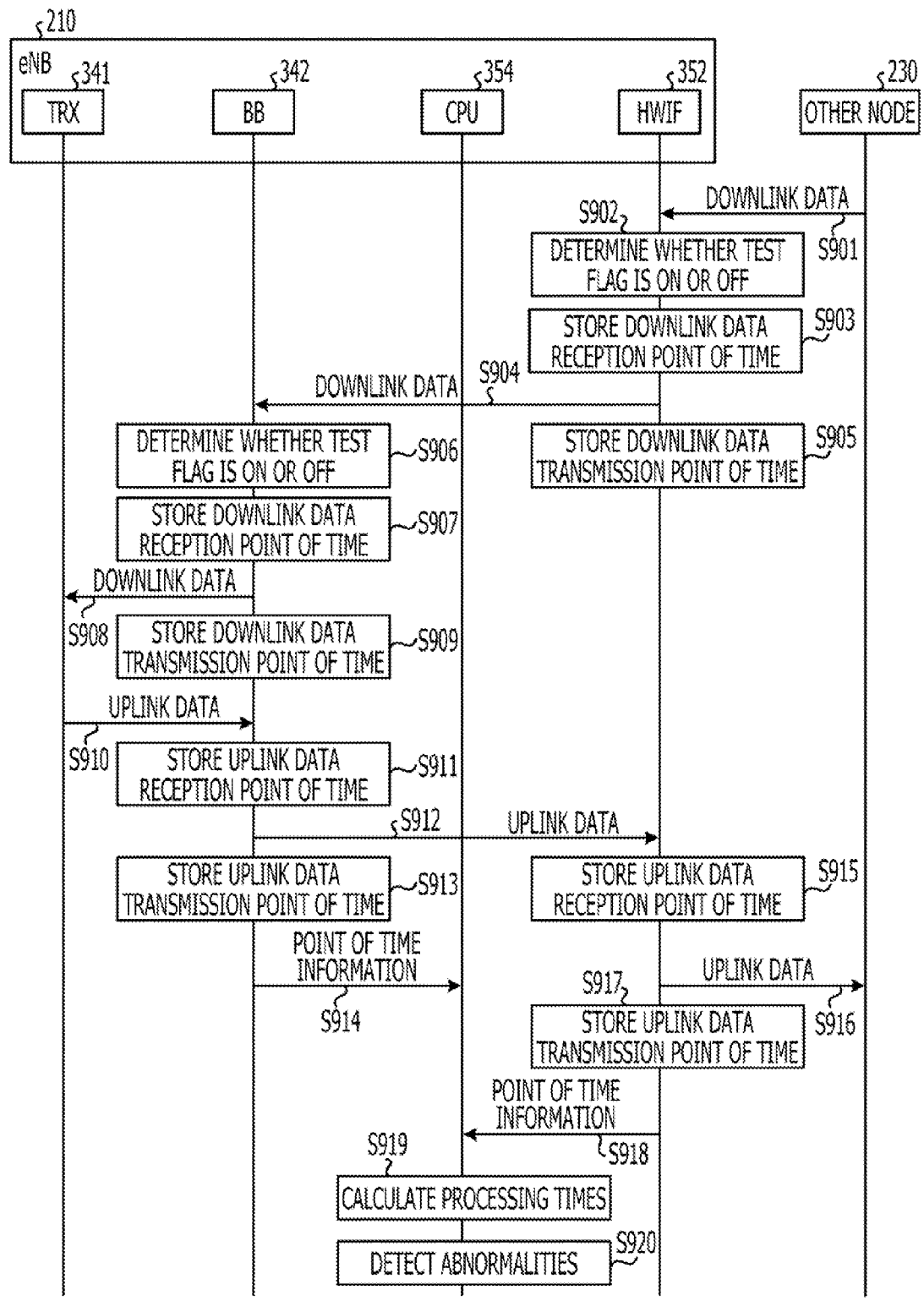
FIG. 9 is a sequence diagram illustrating an example of communication system operations.

FIG. 9 is a sequence diagram illustrating an example of communication system operations. As illustrated in FIG. 9, first, the highway interface 352 receives downlink data from the other node 230 (step S901). A test flag added by the other node 230 is included in the downlink data received in step S901. Additionally, the downlink data test flag is ON indicating that testing for abnormalities is being conducted.

The highway interface 352 then determines whether the test flag included in the downlink data received in step S901 is ON or OFF (step S902). In this case, the test flag is determined to be ON. Additionally, the highway interface 352 stores the reception point of time of the downlink data received in step S901 in a memory (step S903).

The highway interface 352 then transmits the downlink data received in step S901 to the base band unit 342 (step S904). Additionally, the highway interface 352 stores the transmission point of time of the downlink data received in step S904 in the memory (step S905).

The base band unit 342 then determines whether the test flag included in the downlink data received in step S904 is ON or OFF (step S906). In this case, the test flag is determined to be ON. The base band unit 342 also stores the reception point of time of the downlink data received in step S904 in the memory (step S907).

The base band unit 342 then transmits the downlink data received in step S904 to the TRX 341 (step S908). The base band unit 342 also stores the transmission point of time of the downlink data transmitted in step S908 in the memory (step S909).

The base band unit 342 then receives uplink data from the TRX 341 (step S910). The uplink data received in step S910 is assumed to be a response from a mobile station subject to testing of the downlink data transmitted in step S908. The base band unit 342 also stores the reception point of time of the uplink data received in step S910 in the memory (step S911).

The base band unit 342 then transmits the uplink data received in step S910 to the highway interface 352 (step S912). The base band unit 342 also stores the transmission point of time of the uplink data transmitted in step S912 in the memory (step S913).

Additionally, the base band unit 342 transmits the point of time information that indicates the points of time stored in steps S907, S909, S911, and S913 to the call processing unit 354 (step S914). Additionally, the highway interface 352 stores the reception point of time of the uplink data received in step S912 in the memory (step S915).

The highway interface 352 then transmits the uplink data received in step S912 to the other node 230 (step S916). The highway interface 352 also stores the transmission point of time of the uplink data transmitted in step S916 in the memory (step S917).

The highway interface 352 then transmits the point of time information indicating the points of time stored in steps S903, S905, S915, and S917 to the call processing unit 354 (step S918). The call processing unit 354 then calculates the processing times of the base band unit 342 and the highway interface 352 based on the point of time information transmitted in steps S914 and S918 (step S919).

The call processing unit 354 then detects abnormalities in the base band unit 342 and the highway interface 352 based on the processing times calculated in step S919 (step S920). Specifically, the call processing unit 354 compares the processing times with a certain index value and determines that an abnormality occurred in a transfer unit in which a processing time of the base band unit 342 or the highway interface 352 exceeds the index value.

The explanation of step S901 describes a case where the other node 230 transmits downlink data set with the test flag ON. However, setting of the test flag may be conducted by the base station 210. For example, the highway interface 352 sets the test flag of the downlink data transmitted in step S904 to ON.

For example, the other node 230 or the highway interface 352 may have a timer that measures periodic timings and the downlink data test flag may be set to ON at the timing measured by the timer. Additionally, the other node 230 or the highway interface 352 may set the downlink data test flag to OFF at a timing other than the timing measured by the timer.

Furthermore, the other node 230 or the highway interface 352 may set the downlink data test flag to ON according to a timing set by an operation by the user. Additionally, the other node 230 or the highway interface 352 may set the downlink data test flag to OFF at a timing other than the timing set by the operation of the user.

Moreover, the highway interface 352 and the base band unit 342 may store a reception point of time and a transmission point of time for each user. In this case, the point of time information transmitted in steps S914 and S918 represents point of time information that indicates the reception point of time and the transmission point of time for each user.

Point of Time Information Example

FIG. 10 illustrates an example of point of time information stored by a base band unit. The base band unit 342 stores, for example, a table 1000 as illustrated in FIG. 10 as point of time information. In the table 1000, each combination of downlink data and user includes the reception point of time from the highway interface 352 and the transmission point of time to the TRX 341. The table 1000 also includes the reception point of time from the TRX 341 and the transmission point of time to the highway interface 352 for each uplink data and user combination.

The reception point of time of the downlink data received in the base band unit 342 from the highway interface 352 represents the point of time stored in step S907 in FIG. 9. The transmission point of time of the downlink data transmitted from the base band unit 342 to the TRX 341 represents the point of time stored in step S909 in FIG. 9.

The reception point of time of the uplink data transmitted from the TRX 341 to the base band unit 342 represents the point of time stored in step S911 in FIG. 9. The transmission point of time of the uplink data transmitted from the base band unit 342 to the highway interface 352 represents the point of time stored in step S913 in FIG. 9.

FIG. 11 illustrates an example of point of time information stored by a highway interface. The highway interface 352 stores, for example, a table 1100 illustrated in FIG. 11 as point of time information. In the table 1100, each combination of downlink data and user includes the reception point of time from the other node 230, and the transmission point of time to the base band unit 342. The table 1100 also includes the reception point of time from the base band unit 342 and the transmission point of time to the other node 230 for each combination of uplink data and user.

The reception point of time of the downlink data received in the highway interface 352 from another node (S-GW or eNB) represents the point of time stored in step S903 in FIG. 9. The transmission point of time of the downlink data transmitted from the highway interface 352 to the base band unit 342 represents the point of time stored in step S905 in FIG. 9.

The reception point of time of the uplink data received in the highway interface 352 from the base band unit 342 represents the point of time stored in step S915 in FIG. 9. The transmission point of time of the uplink data transmitted from the highway interface 352 to the other node represents the point of time stored in step S917 in FIG. 9.

FIG. 12 illustrates an example of processing times calculated by a call processing unit. The call processing unit 354 creates, for example, a table 1200 as illustrated in FIG. 12 based on the table 1000 received from the base band unit 342 and the table 1100 received from the highway interface 352. The table 1200 includes downlink data and uplink data processing times of the base band unit 342 for each user. The table 1200 also includes downlink data and uplink data processing times of the highway interface 352 for each user.

For example, a processing time a1 of the downlink data of user "1" in the base band unit 342 is the difference between the point of time "aa:aa" and the point of time "aa:bb" in the table 1000. A processing time b1 of the uplink data of user "1" in the base band unit 342 is the difference between the point of time "aa:cc" and the point of time "aa:dd" in the table 1000.

A processing time c1 of the downlink data of user "1" in the highway interface 352 is the difference between the point of time "AA:AA" and the point of time "AA:BB" in the table 1100. A processing time d1 of the uplink data of user "1" in the highway interface 352 is the difference between the point of time "AA:CC" and the point of time "AA:DD" in the table 1100.

Moreover, index values A and B are set in regards to the base band unit 342 downlink data and uplink data respectively in table 1200. Index values C and D are also set in regards to the highway interface 352 downlink data and uplink data respectively in table 1200.

The index values in the table 1200 are set ahead of time by, for example, a network monitor. Moreover, the index values in table 1200 may be dynamically changed during operation of the communication system 200. For example, the call processing unit 354 periodically calculates an average value of a certain number of past processing times, and then adds a margin to the calculated average value and sets the resulting value as the index value. In this way, a suitable index value can be automatically set based on processing times changing due to load conditions of the base band unit 342 and the highway interface 352 by setting an index value based on past obtained processing times.

The following describes the detection of an abnormality in the base band unit 342. The call processing unit 354 compares the processing times with the index value and detects an abnormality based on the result of the comparison. For example, the call processing unit 354 compares the processing time a1 with the index value A and determines that an abnormality occurred with the base band unit 342 user "1" downlink data if the processing time a1 is higher than the index value A. Moreover, the call processing unit 354 determines that an abnormality has not occurred with the base band unit 342 user "1" downlink data if the processing time a1 is not higher than the index value A. Although the above explanation uses the base band unit 342 user "1" downlink data, the operation is similar if the users "2" or "3," or the uplink data is used.

Furthermore, the call processing unit 354 may compare the processing times of the base band unit 342 with the index value and detect an abnormality of the base band unit 342 based on multiple comparison results. For example, the call processing unit 354 may determine that an abnormality occurred in the base band unit 342 when a certain number or more of the base band unit 342 processing times are higher than the index value. The call processing unit 354 may also determine that an abnormality did not occur in the base band unit 342 when less than a certain number of the base band unit 342 processing times is higher than the index value.

Moreover, the call processing unit 354 may detect gradual abnormalities according to the number of processing times of the base band unit 342 higher than the index value. For example, the call processing unit 354 may determine that the abnormalities that occurred are more important as the number of processing times of the base band unit 342 higher than the index value increase.

Although the above explanation describes the detection of abnormalities in the base band unit 342, the detection of abnormalities may be similarly conducted for the highway interface 352. In this way, the call processing unit 354 can detect abnormalities in the transfer units by comparing the processing times of each of the transfer units (the base band unit 342 and the highway interface 352) with an index value.

Processing Based on Detection Results

The call processing unit 354 performs certain processing according to the detection results of abnormalities in the transfer units (the base band unit 342 and the highway interface 352). The certain processing is set ahead of time, for example, by the network monitor. For example, the call processing unit 354 outputs the detection result information indicating the detection results to a user of the base station 210. The call processing unit 354 may also transmit the detection result information to a communication device monitoring the base station 210.

Moreover, the call processing unit 354 may control the base station 210 based on the abnormality detection results. When an abnormality is detected in a transfer unit, for example, the call processing unit 354 switches from the transfer unit in which the abnormality occurred to a redundant path if a redundant path for bypassing the transfer unit in which the abnormality occurred to transfer the user data exists. Moreover, when switching to a redundant path, the call processing unit 354 may switch to the redundant path after conducting a handover (if possible) to another base station of the mobile station 220. As a result, disconnecting the communication of the mobile station 220 by switching to the redundant path can be avoided.

Furthermore, after an abnormality occurs in the transfer unit, the call processing unit 354 may reboot the transfer unit in which the abnormality occurred. When rebooting a transfer unit in which an abnormality occurred, the call processing unit 354 may also reboot the transfer unit in which the abnormality occurred after conducting a handover (if possible) to another base station of the mobile station 220. As a result, disconnecting the communication of the mobile station 220 by rebooting the transfer unit can be avoided.

Moreover, if there is no redundant path for bypassing the transfer unit in which the abnormality occurred to transfer the user data when an abnormality occurs in the transfer unit, the call processing unit 354 may also reboot the transfer unit when the handover to another base station of the mobile station 220 is impossible.

In this way, the communication system 100 according to the first embodiment detects an abnormality of the transfer unit 111 based on the time taken to receive and transmit user data for the transfer unit 111 that transfers the user data without terminating the user data. As a result, an abnormality can be detected even in the transfer unit 111 that does not terminate the user data. As a result, locations of abnormalities in a network can be accurately identified.

Embodiment 2

Communication System

Figure 13:
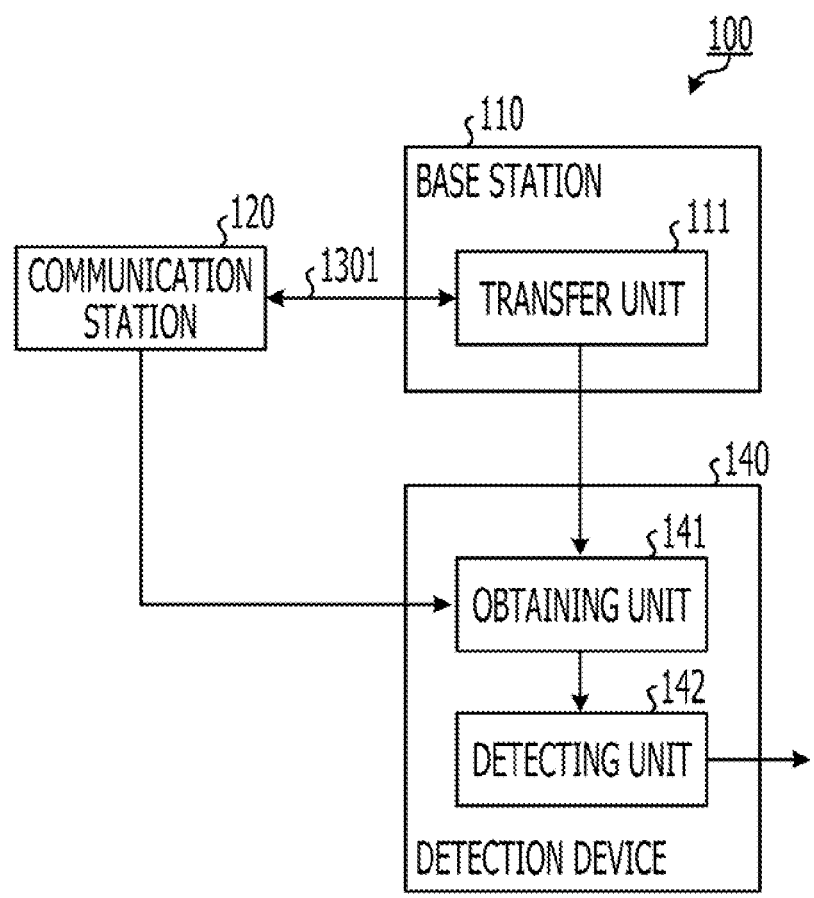
FIG. 13 illustrates a communication system according to a second embodiment.

FIG. 13 illustrates a communication system according to a second embodiment. In FIG. 13, a configuration similar to that shown in FIG. 1 is denoted by the same reference symbols and the description thereof is omitted. As illustrated in FIG. 13, a communication system 100 according to the second embodiment includes a base station 110, a communication station 120, and a detection device 140. The communication system 100 however does not include the communication station 130 illustrated in FIG. 1.

The communication station 120 transmits and receives user data via a transmission line 1301 between the communication station 120 and the base station 110. The communication station 120 is, for example, another node connected to the base station 110. The obtaining unit 141 of the detection device 140 obtains a period of time (hereinafter referred to as "transmission interval") from when one of the base station 110 or the communication station 120 receives the user data, to when the other one of the base station 110 or the communication station 120 receives the user data. As a result, the obtaining unit 141 can obtain the transmission interval of the user data transmitted between the base station 110 and the communication station 120.

The obtaining unit 141 obtains, for example, the transmission interval from when the base station 110 transmits the user data to when the communication station 120 receives the user data, as well as the transmission interval from when the communication station 120 transmits the user data to when the base station 110 receives the user data. Specifically, the obtaining unit 141 obtains, from the base station 110, the transmission point of time and reception point of time of the user data transmitted by the base station 110, and obtains, from the communication station 120, the transmission point of time and reception point of time of the user data transmitted by the communication station 120. The obtaining unit 141 then calculates the transmission interval based on the obtained reception points of time and transmission points of time. The obtaining unit 141 outputs the calculated transmission interval to the detecting unit 142.

The detecting unit 142 detects an abnormality in the transmission line 1301 between the base station 110 and the communication station 120 based on the transmission interval outputted by the obtaining unit 141. The detecting unit 142 detects, for example, an abnormality of the transmission line 1301 based on results of comparing the transmission interval with an index value. Specifically, the detecting unit 142 determines that an abnormality occurred in the transmission line 1301 if the transmission interval exceeds a threshold, and determines that an abnormality did not occur in the transmission line 1301 if the transmission interval does not exceed the threshold. The detecting unit 142 outputs detection result information indicating the result of the detection of an abnormality. The detecting unit 142 may transmit, for example, the detection result information to a communication device monitoring the base station 110.

Moreover, a control unit that controls the communication system 100 based on the detection result information outputted by the detecting unit 142 may be provided, for example, in the base station 110 or the detection device 140. When, for example, a redundant path for transferring the user data that bypasses the transmission line 1301 exists, the control unit switches from the transmission line 1301 to the redundant path if an abnormality occurs in the transmission line 1301. Furthermore, the control unit may reboot at least one of the base station 110 and the communication station 120 if an abnormality occurs in the transmission line 1301.

Additionally, the user data transferred by the transfer unit 111 of the base station 110 may include a flag that indicates whether detecting of abnormalities of the transmission line 1301 is being conducted or not. The transfer unit 111 and the communication station 120 transfer, to the detection device 140, the reception point of time and the transmission point of time of the user data that includes the flag (e.g., the flag indicates "ON") indicating whether or not abnormality testing is being conducted. Conversely, the transfer unit 111 and the communication station 120 do not transfer, to the detection device 140, the reception point of time and the transmission point of time of the user data that includes the test flag indicating that abnormality testing is not being conducted (e.g., the flag indicates "OFF").

In this case, the obtaining unit 141 of the detection device 140 obtains the transmission interval of the transmission line 1301 for the user data that includes the flag indicating that abnormality testing is being conducted, but does not obtain the transmission interval of the transmission line 1301 for the user data that includes the flag indicating that abnormality testing is not being conducted. As a result, obtaining the transmission interval related to all the user data transferred through the transmission line 1301 can be avoided, thus suppressing an increase in the load on the detection device 140.

Furthermore, the communication system 100 illustrated in FIG. 13 may also have the functions of the communication system 100 illustrated in FIG. 1. The following describes a communication system 100 having the functions illustrated in FIGS. 1 and 13. That is, the communication system 100 detects abnormalities of the transfer unit 111 and of the transmission line 1301.

Although the above explanation describes a configuration in which the detection device 140 is provided separately from the base station 110 and the communication station 120, the detection device 140 may also be provided in the base station 110 or the communication station 120. Additionally, the transmission line 1301 may include, for example, a relay device such as a router or the like.

Figure 14:
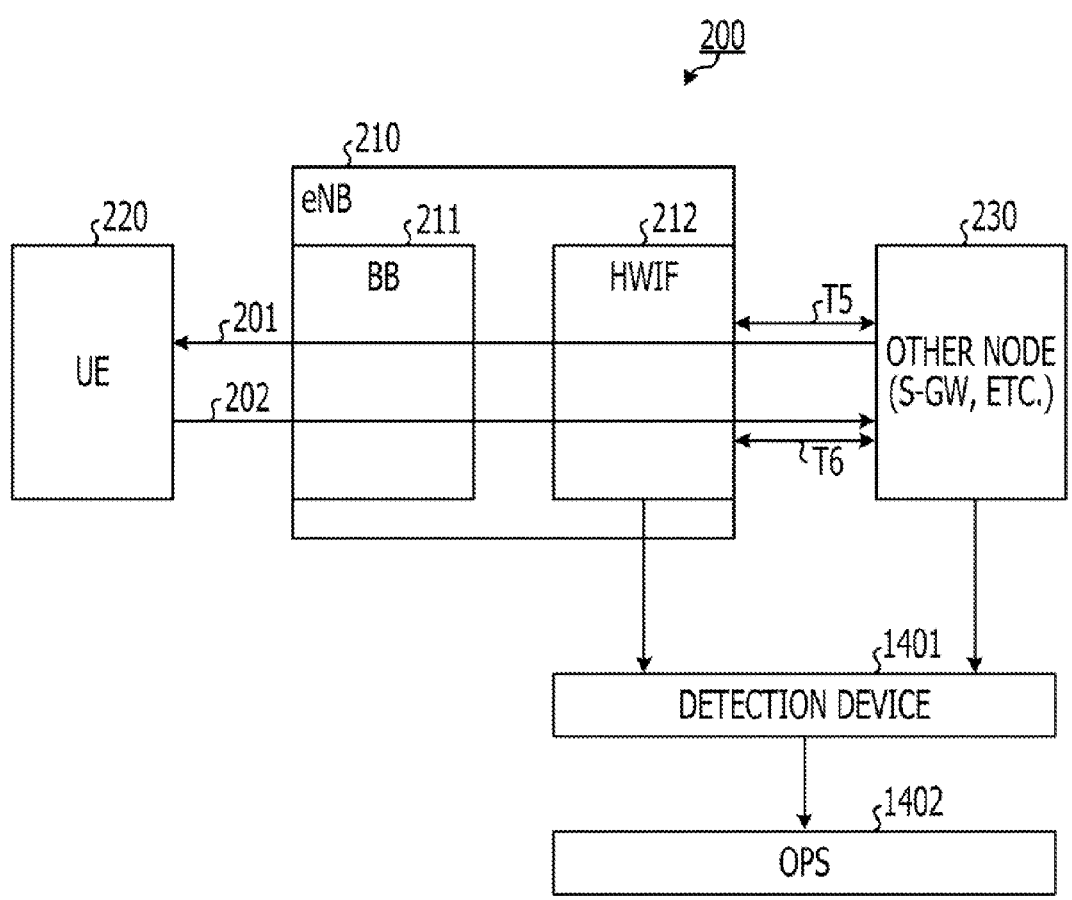
FIG. 14 illustrates a specific example of a communication system.

FIG. 14 illustrates an example configuration of a communication system. In FIG. 14, the portions similar to that illustrated in FIG. 2 are denoted by the same reference symbols and the description thereof is omitted. A communication system 200 illustrated in FIG. 14 is a specific example of the communication system 100 illustrated in FIG. 13. A detection device 1401 corresponds to the detection device 140 illustrated in FIG. 13. The detection device 1401 is provided separately from a base station 210 and another node 230.

The detection device 1401 measures at least one of transmission intervals T5 and T6. The transmission interval T5 is the period of time from when the other node 230 transmits downlink data 201 to when a highway interface 212 receives the downlink data 201. The transmission interval T6 is the period of time from when the highway interface 212 transmits uplink data 202 to when the other node 230 receives the uplink data 202.

The detection device 1401 detects an abnormality of a transmission line between the base station 210 and the other node 230 based on the transmission intervals T5 and T6 obtained by the obtaining unit 141. The detection device 1401 transmits detection result information to an operation system 1402 (OPS). The operation system 1402 performs certain processing based on the detection result information transmitted by the detection device 1401.

Base Station and Other Node Examples

Specific examples of the base station 209 and the other node 230 are similar to the examples illustrated in FIGS. 3 to 6.

Unit Processing Examples

Processing by the base band unit 342 and the highway interface 352 is similar to the processing illustrated in FIG. 7.

Figure 15:
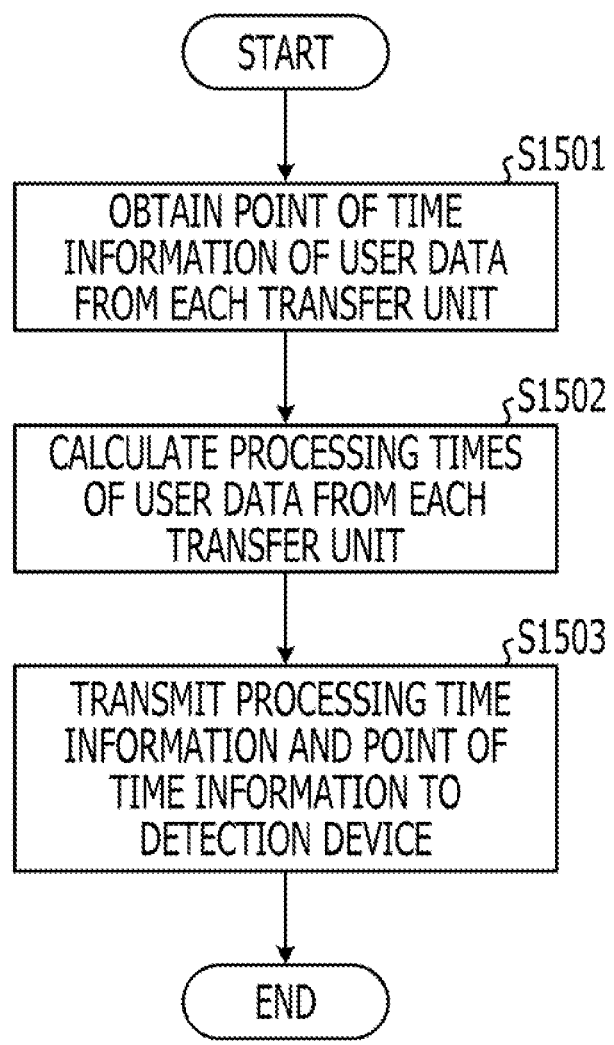
FIG. 15 is a flowchart illustrating an example of call processing unit processing.

FIG. 15 is a flowchart illustrating an example of call processing unit processing. Steps S1501 and S1502 illustrated in FIG. 15 are similar to steps S801 and S802 illustrated in FIG. 8 and therefore an explanation will be omitted. After step S1502, the call processing unit 354 transmits processing time information and point of time information to the detection device 1401 (step S1503), and then the series of steps is completed. The processing time information transmitted in step S1503 is processing time information that indicates the processing times calculated in step S1502.

The point of time information transmitted in step S1503 is point of time information indicating the points of time the user data was transmitted and received by the base station 210. The point of time that the base station 210 received the user data is, for example, the point of time when the highway interface 352 received downlink data from the other node 230. The point of time that the base station 210 transmitted the user data is, for example, the point of time when the highway interface 352 transmitted uplink data to the other node 230.

Figure 16:
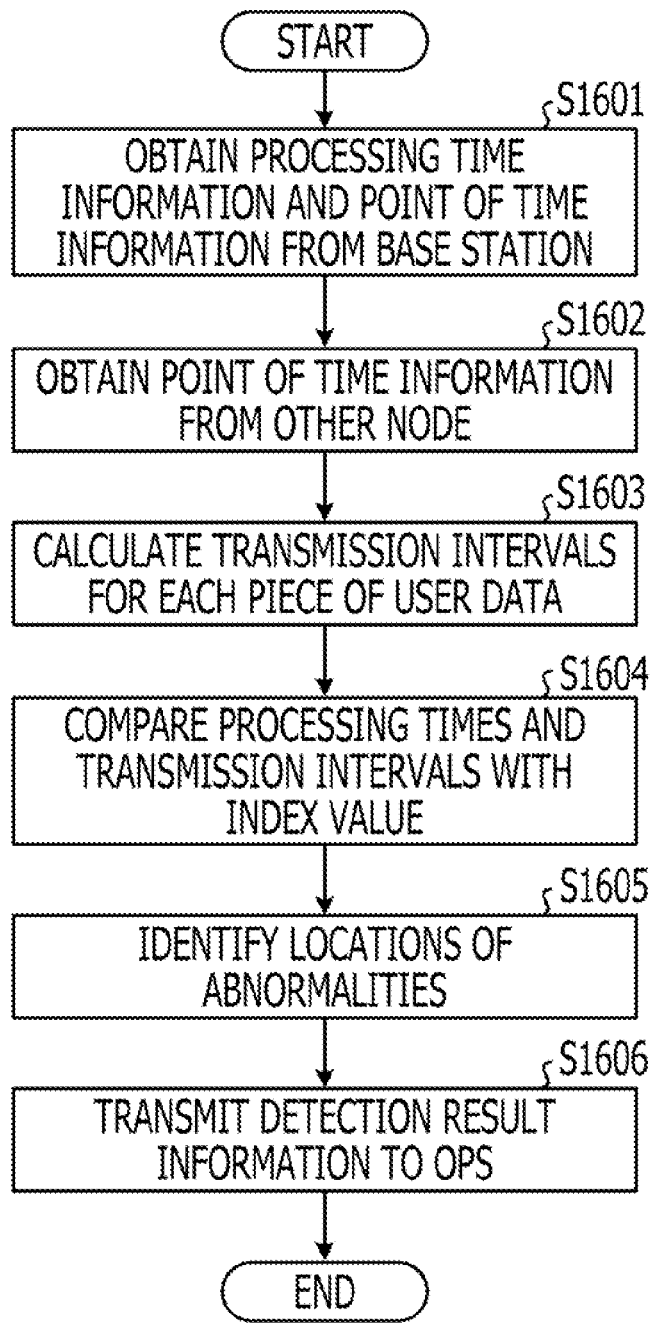
FIG. 16 is a flowchart illustrating an example of detection device processing.

FIG. 16 is a flowchart illustrating an example of detection device processing. To begin, the detection device 1401 obtains, from the base station 210, the processing time information and the point of time information transmitted in step S1503 illustrated in FIG. 15 (step S1601). The detection device 1401 then obtains the point of time information from the other node 230 (step S1602).

The point of time information obtained in step S1602 is the point of time information indicating the points of time the user data was transmitted and received by the other node 230. The point of time when the other node 230 transmitted the user data is, for example, the point of time the other node 230 transmitted the downlink data to the base station 210. The point of time when the other node 230 received the user data is, for example, the point of time the other node 230 received the uplink data from the base station 210.

The detection device 1401 then calculates the transmission intervals between the base station 210 and the other node 230 for each piece of user data based on steps S1601 and S1602 (step S1603). The detection device 1401 then compares the transmission intervals calculated in step S1603 and the processing times of the base station 210 obtained in step S1601, with an index value (step S1604).

The detection device 1401 then identifies locations of abnormalities in the transfer units of the base station 210 and in the transmission line between the base station 210 and the other node 230 based on the results of the comparison conducted in step S1604 (step S1605). The detection device 1401 then transmits the detection result information indicating the locations of abnormalities identified in step S1605 to the operation system 1402 (step S1606), and then the series of steps is completed.

Communication System Operation Example

Figure 17:
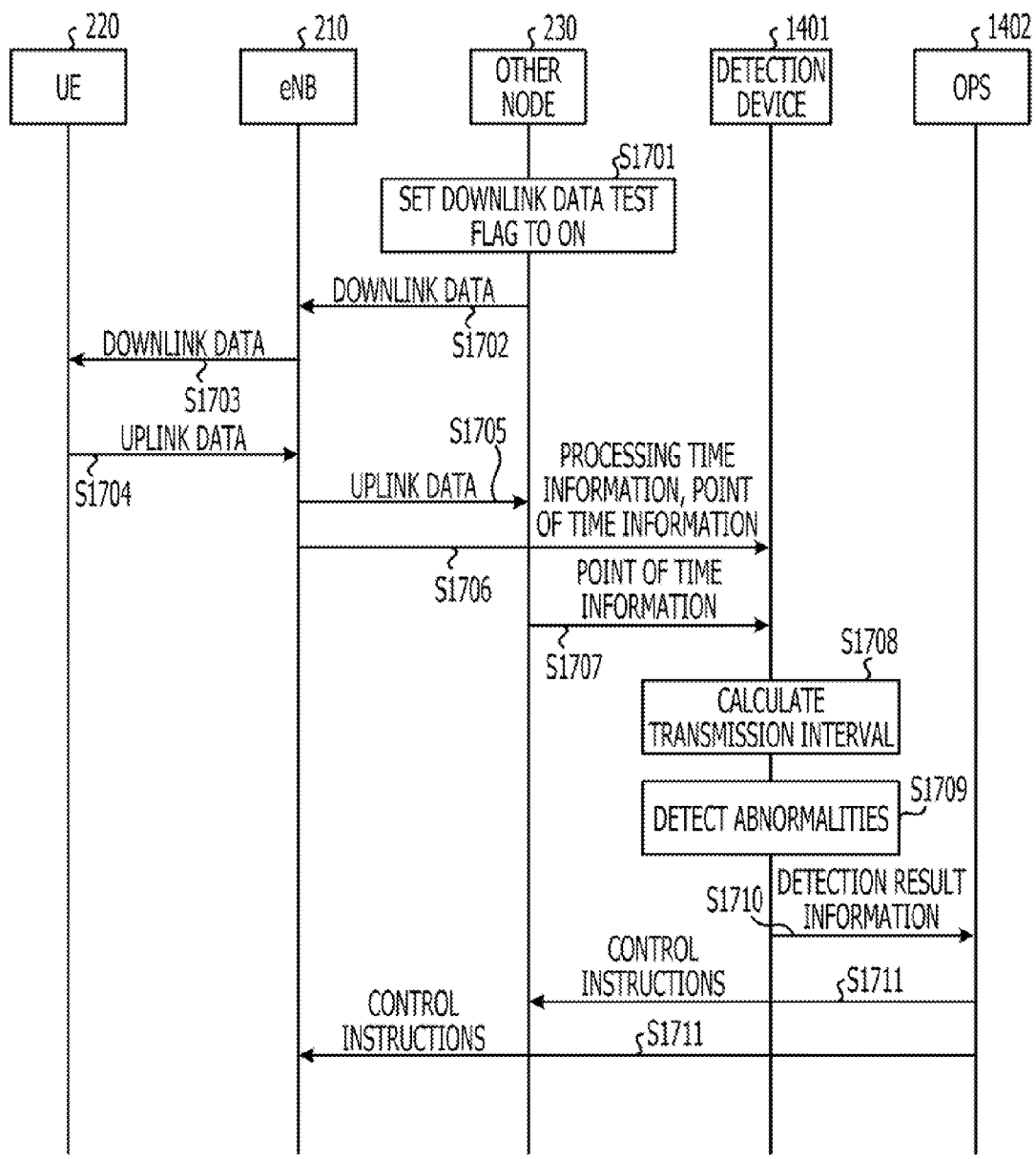
FIG. 17 is a sequence diagram illustrating an example of communication system operations.

FIG. 17 is a sequence diagram illustrating an example of communication system operations. As illustrated in FIG. 17, the other node 230 first sets the downlink data test flag to ON (step S1701). Next, the other node 230 transmits the downlink data in which the test flag is set to ON in step S1701, to the base station 210 (step S1702). The other node 230 also stores the transmission point of time of the downlink data transmitted in step S1702 in a memory.

The base station 210 then transmits the downlink data transmitted in step S1702 to the mobile station 220 (step S1703). The base station 210 also stores the transmission and reception points of time of the downlink data from steps S1702 and S1703. Storing of the transmission and reception points of time is conducted, for example, in the same way as steps S903, S905, S907, and S909 illustrated in FIG. 9.

Next, the mobile station 220 transmits uplink data including the test flag set to ON to the base station 210 (step S1704). The base station 210 then transmits the uplink data transmitted in step S1704 to the other node 230 (step S1705). The other node 230 stores the reception point of time of the uplink data transmitted in step S1705 in a memory. The base station 210 also stores the transmission and reception points of time of the uplink data from steps S1704 and S1705. Storing of the transmission and reception points of time is conducted, for example, in the same way as steps S911, S913, S915, and S917 illustrated in FIG. 9.

Additionally, the base station 210 calculates the processing times of the transfer units based on the transmission and reception points of time of the downlink data stored in steps S1702 and S1703, and on the transmission and reception points of time of the uplink data stored in steps S1704 and S1705. The calculation of the processing times of the transfer units is conducted, for example, in the same way as steps S914, S918, and S919 illustrated in FIG. 9.

The base station 210 then transmits the processing time information indicating the calculated processing times, and the point of time information indicating the user data transmission and reception points of time of the base station 210, to the detection device 1401 (step S1706). The other node 230 then transmits the point of time information indicating the user data transmission and reception points of time in the other node 230, to the detection device 1401 (step S1707). The point of time information transmitted in step S1707 is point of time information indicating the transmission point of time of the downlink data transmitted in step S1702, and the reception point of time of the uplink data received in step S1705.

The detection device 1401 then calculates the transmission interval between the base station 210 and the other node 230 based on the point of time information transmitted in steps S1706 and S1707 (step S1708). The detection device 1401 then detects abnormalities in the base station 210 transfer units and in the transmission line between the base station 210 and the other node 230 (step S1709).

Specifically, the detection device 1401 detects abnormalities in the transfer units of the base station 210 based on the processing time information transmitted in step S1706. The detection device 1401 also detects abnormalities in the transmission line between the base station 210 and the other node 230 based on the transmission interval calculated in step S1708.

Next, the detection result information indicating the results of the detection conducted in step S1709 is transmitted to the operation system 1402 (step S1710). The operation system 1402 then transmits control instructions based on the detection result information transmitted in step S1710, to the other node 230 and the base station 210 (step S1711), and then the series of steps is completed.

Point of Time Information Example

The point of time information stored by the base band unit 342 and the highway interface 352 is similar to the point of time information illustrated in tables 1000 and 1100 illustrated in FIGS. 10 and 11 respectively.

FIG. 18 illustrates an example of processing times calculated by a call processing unit. The call processing unit 354 creates, for example, a table 1800 as illustrated in FIG. 18 based on the table 1000 received from the base band unit 342 and the table 1100 received from the highway interface 352.

The processing times in table 1800 are similar to the table 1200 illustrated in FIG. 12. However, since the call processing unit 354 does not conduct abnormality detection, index values do not need to be included in the table 1800. The call processing unit 354 transmits the table 1800 to the detection device 1401 as processing time information in step S1706 illustrated in FIG. 17.

FIG. 19 illustrates an example of point of time information sent to a detection device by a base station. The base station 210, for example, transmits a table 1900 illustrated in FIG. 19 as point of time information to the detection device 1401 in step S1706 illustrated in FIG. 17. The reception points of time when the base station 210 received the downlink data from the other node 230, and the transmission points of time when the base station 210 transmitted the uplink data to the other node 230, are included in the table 1900 for each user.

The table 1900 reception points of time represent the points of time in which the downlink data is received from the other node 230 indicated in the table 1100 (see FIG. 11) obtained from the highway interface 352. The table 1900 transmission points of time represent the points of time in which the downlink data is transmitted to the other node 230 indicated in the table 1100 (see FIG. 11) obtained from the highway interface 352.

FIG. 20 illustrates an example of point of time information transmitted to a detection device by another node. The other node 230, for example, transmits a table 2000 illustrated in FIG. 20 as point of time information to the detection device 1401 in step S1707 illustrated in FIG. 17. The transmission points of time when the other node 230 transmitted the downlink data to the base station 210, and the reception points of time when the other node 230 received the uplink data from the base station 210, are included in the table 2000 for each user.

The downlink data transmission points of time in the table 2000 are points of time when the other node 230 transmitted the downlink data to the base station 210 in step S1702 illustrated in FIG. 17. The downlink data reception points of time in the table 2000 are points of time when the other node 230 received the uplink data from the base station 210 in step S1705 illustrated in FIG. 17.

FIG. 21 illustrates an example of processing times and transfer intervals managed by a detection device. The detection device 1401 creates a table 2100 as illustrated, for example, in FIG. 21 based on the tables 1800 and 1900 received from the base station 210 and the table 2000 received from the other node 230. The table 2100 includes processing times of the base station 210 transfer units (the base band unit 342 and the highway interface 352), and transmission intervals of the transmission of the downlink data and the uplink data between the base station 210 and the mobile station 220.

The processing times of the transfer units of the base station 210 are similar to those of the table 1200 illustrated in FIG. 12. For example, a transmission interval e1 of the user "1" downlink data transmitted between the base station 210 and the mobile station 220 represents the difference between the point of time "EE:EE" from table 2000 and the point of time "AA:AA" from table 1900. For example, a transmission interval f1 of the user "1" uplink data transmitted between the base station 210 and the mobile station 220 represents the difference between the point of time "AA:DD" from table 1900 and the point of time "EE:HH" from table 2000.

Moreover, index values A and B are set in the table 2100 in regards to the base band unit 342 downlink data and uplink data, respectively. Similarly, index values C and D are also set in regards to the highway interface 352 downlink data and uplink data respectively in the table 2100. The index values A to D are similar to the index values A to D in the table 1200 illustrated in FIG. 12.

Moreover, index values E and F are set in the table 2100 in regards to the transmission intervals of the respective downlink data and uplink data between the base station 210 and the mobile station 220. The index values E and F in the table 2100 are set ahead of time by, for example, a network monitor. Moreover, the index values E and F in the table 2100 may be dynamically changed during operation of the communication system 200. For example, the detection device 1401 periodically calculates an average value of a certain number of past transmission intervals, and then adds a margin to the calculated average value and sets the resulting value as the index value. In this way, suitable index values can be automatically set based on transmission intervals that change according to load conditions of the transmission line between the base station 210 and the other node 230 by setting the index values according to past obtained transmission intervals.

The detection device 1401 compares the transmission intervals and the index values and then detects abnormalities in the transmission line between the base station 210 and the other node 230 based on the results of the comparison. For example, the detection device 1401 compares the transmission interval e1 with the index value E and determines that an abnormality occurred in the downlink data in the transmission line between the base station 210 and the other node 230 if the transmission interval e1 is higher than the index value E. Similarly, the detection device 1401 determines that an abnormality has not occurred in the downlink data in the transmission line between the base station 210 and the other node 230 if the transmission interval e1 is not higher than the index value E. Although the above explanation involves the downlink data between the base station 210 and the other node 230, the same process may be conducted in relation to the uplink data between the base station 210 and the other node 230.

The detection device 1401 may also compare the transmission intervals between the base station 210 and the other node 230 with the index values and thus detect an abnormality in the transmission line between the base station 210 and the other node 230 based on multiple comparison results. For example, the detection device 1401 determines that an abnormality occurred in the transmission line between the base station 210 and the other node 230 if a certain number or more of the transmission intervals between the base station 210 and the other node 230 are higher than the index values. Moreover, the detection device 1401 determines that an abnormality has not occurred in the transmission line between the base station 210 and the other node 230 if less than a certain number or more of the transmission intervals between the base station 210 and the other node 230 are higher than the index values.

Moreover, the detection device 1401 may gradually detect abnormalities in response to the number of transmission intervals between the base station 210 and the other node 230 higher than the index values. For example, the detection device 1401 may determine that the abnormalities that occurred are more important as the number of transmission intervals between the base station 210 and the other node 230 higher than the index value increase.

Processing Based on Detection Results

The operation system 1402 performs certain processing based on the results of detecting abnormalities in the transmission line between the base station 210 and the other node 230. The certain processing is set ahead of time, for example, by the network monitor. For example, the operation system 1402 outputs detection result information indicating the detection results to the network monitor.

Additionally, the operation system 1402 may control at least one of the base station 210 and the other node 230 based on the abnormality detection results. If, for example, a redundant path for bypassing the transmission line between the base station 210 and the other node 230 and transferring the user data exists, the operation system 1402 switches transmission to the redundant path when an abnormality occurs in the transmission line between the base station 210 and the other node 230.

Moreover, when switching to a redundant path, the operation system 1402 may switch to the redundant path after conducting a handover (if possible) to another base station of the mobile station 220. As a result, disconnecting the communication of the mobile station 220 by switching to the redundant path can be avoided.

Furthermore, the operation system 1402 may reboot at least one of the base station 210 and the other node 230 if an abnormality occurs in the transmission line between the base station 210 and the other node 230. When at least one of the base station 210 and the other node 230 is rebooted, the operation system 1402 may perform the rebooting after conducting the handover (if possible) between the mobile station 220 and another base station. As a result, disconnecting the communication of the mobile station 220 by switching to the redundant path can be avoided.

The operation system 1402 may also perform rebooting if the handover from the mobile station 220 to the other base station is impossible when an abnormality occurs in the transmission line between the base station 210 and the other node 230 and a redundant path for bypassing the transmission line does not exist.

In this way, in the communication system 100 according to the second embodiment, an abnormality is detected in the transmission line 1301 between the base station 210 and the other node 230 based on the user data transmission intervals with the other node 230 for the base station 210 that transfers user data without terminating the user data. As a result, an abnormality can be detected in the transmission line 1301 that ends at the base station 210 that does not terminate the user data. As a result, locations of abnormalities in a network can be accurately identified.

Communication System Application Example

Figure 22:
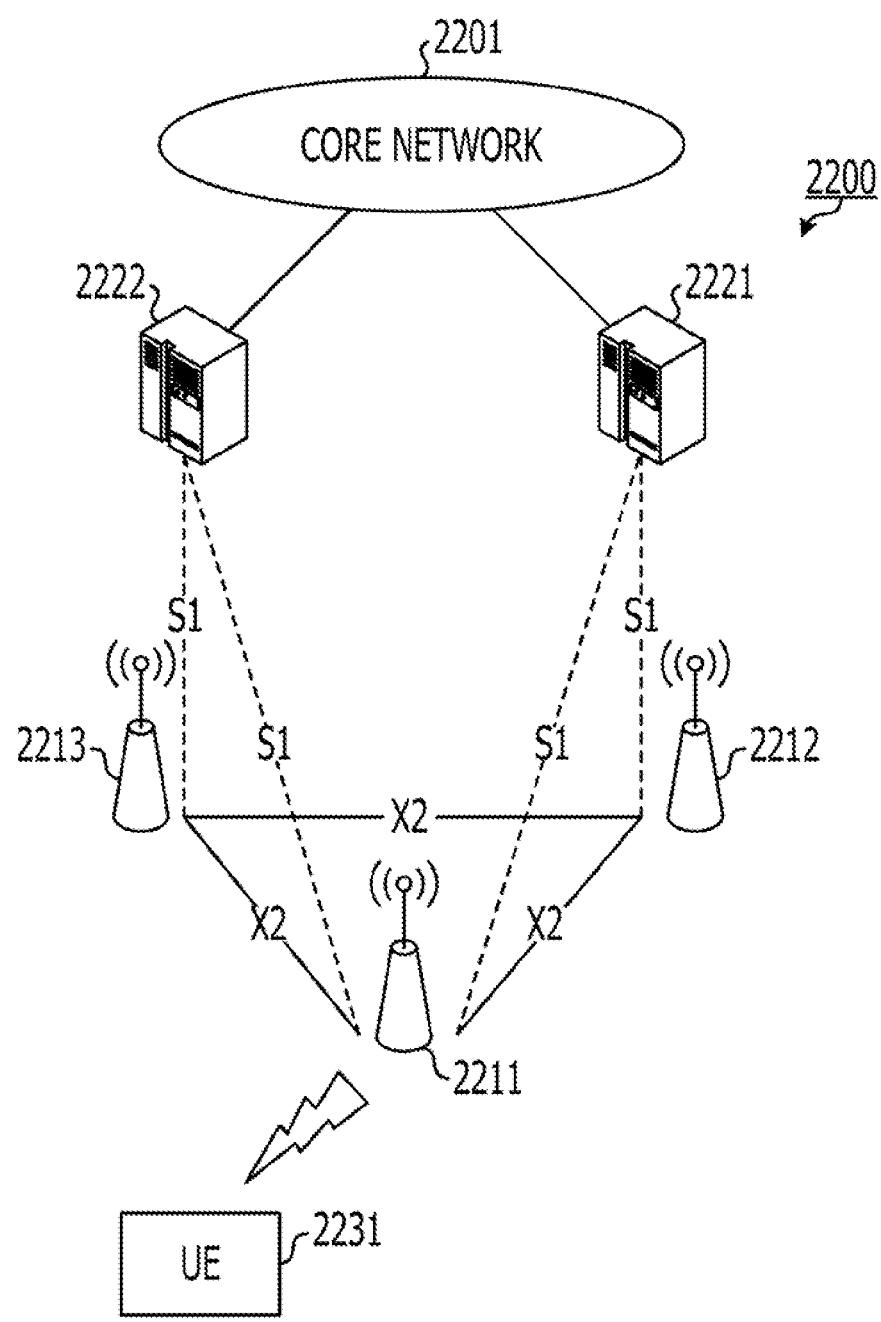
FIG. 22 illustrates an application example of a communication system.

FIG. 22 illustrates an application example of a communication system. The communication system 200 illustrated in FIG. 2 or FIG. 14 can be applied, for example, to a communication system 2200 illustrated in FIG. 22. The communication system 2200 is an LTE communication system which includes base stations 2211 to 2213, host communication stations 2221 and 2222, and a mobile station 2231.

The base stations 2211 to 2213 (eNB) are interconnected with X2 interfaces. The base stations 2211 to 2213 are also connected to the host communication stations 2221 and 2222 via S1 interfaces. The host communication stations 2221 and 2222 are, for example, S-GW or MME. The host communication stations 2221 and 2222 are connected to a core network 2201.

The base station 210 illustrated in FIGS. 2 and 14 can be applied to any of the base stations 2211 to 2213. Herein, the base station 210 applies to the base station 2211. In this case, the mobile station 220 illustrated in FIGS. 2 and 14 may be applicable to the mobile station 2231 connected to the base station 2211. Moreover, the other node 230 illustrated in FIGS. 2 and 14 may be applicable to the host communication station 2221. In this case, the base station 2211 transfers (relays) user data transmitted between the mobile station 2231 and the host communication station 2221.

Figure 23:
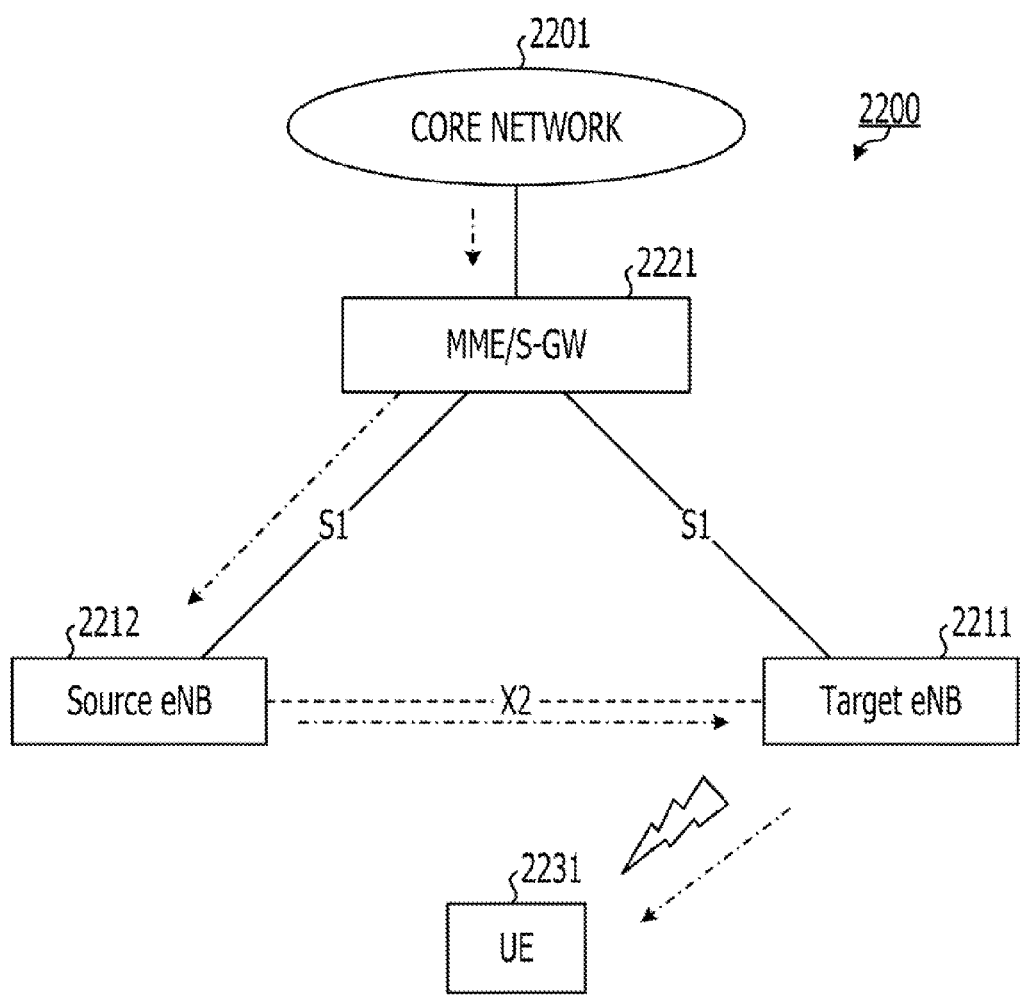
FIG. 23 illustrates an example of a mobile station handover.

FIG. 23 illustrates an example of a mobile station handover. The communication system 2200 illustrated in FIG. 22 is described when the mobile station 2231 conducts a handover from the base station 2212 (source eNB) to the base station 2211 (target eNB). As illustrated in FIG. 23, the base station 2211 in this case is transmitting and receiving user data of the mobile station 2231 with the host communication station 2221 via the base station 2212.

Therefore, the base station 210 illustrated in FIGS. 2 and 4 can be applicable to the base station 2211, and the other node 230 illustrated in FIGS. 2 and 4 can be applicable to the base station 2212. In this case, the base station 2211 transfers (relays) user data transmitted between the mobile station 2231 and the base station 2212.

Figure 24:
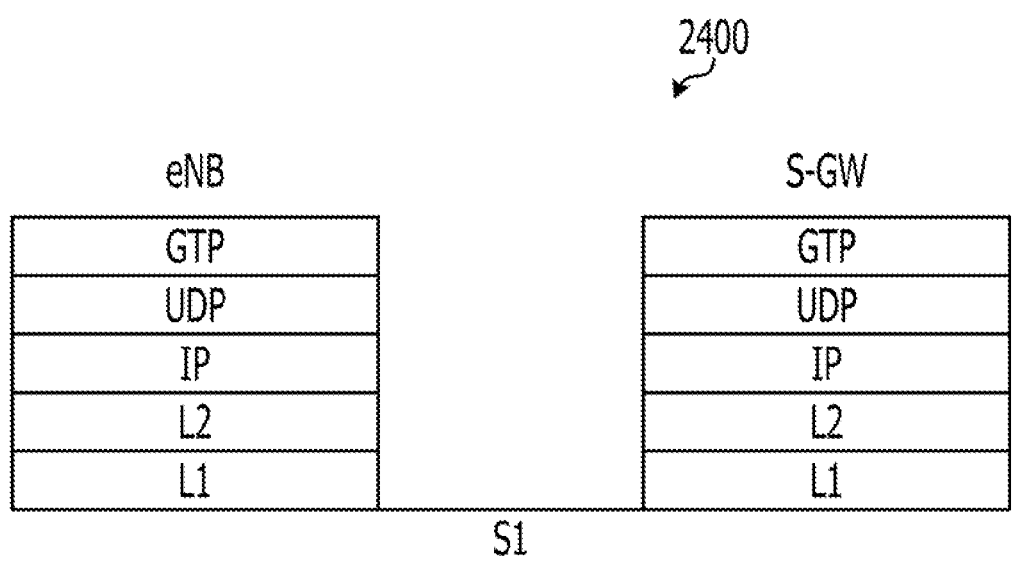
FIG. 24 illustrates an example of an S1 interface protocol stack.

FIG. 24 illustrates an example of an S1 interface protocol stack. A protocol stack 2400 of FIG. 24 represents a protocol stack of the S1 interfaces connecting the base stations 2211 to 2213 (eNB) and the host communication stations 2221 and 2222 (S-GW). As illustrated in the protocol stack 2400, the GTP is set in the layer above the UDP in the S1 interfaces. The GTP is processed by, for example, the GTP processing unit 402 illustrated in FIG. 4 or the GTP processing unit 502 illustrated in FIG. 5.

Figure 25:
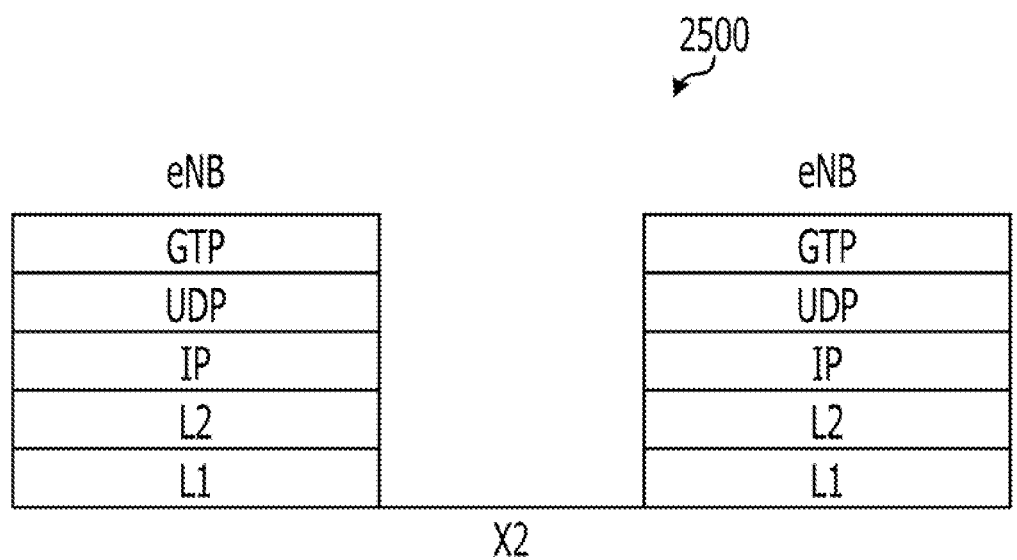
FIG. 25 illustrates an example of an X2 interface protocol stack.

FIG. 25 illustrates an example of an X2 interface protocol stack. A protocol stack 2500 of FIG. 25 represents a protocol stack of the X2 interfaces connecting the base stations 2211 to 2213 (eNB) to each other. As illustrated in the protocol stack 2500, the GTP is set in the layer above the UDP in the X2 interfaces.

FIG. 26 illustrates an example of a GTP header. The GTP header illustrated in FIG. 26 represents a GTP header used by the S1 and X2 interfaces. "Version" (Version field) in the GTP header 2600 is a GTP protocol version. "PT" (Protocol Type) is the protocol identifier. Specifically, "PT" indicates whether the GTP is a type for subscriber information transmission or a type for billing information transmission.

"(*)" is a reserve bit 2601. The abovementioned test flag can be implemented by using the reserve bit 2601. Specifically, abnormality detection in the communication system 200 is conducted on the user data with the reserve bit 2601 set to ON (1). Similarly, abnormality detection in the communication system 200 is not conducted on the user data with the reserve bit 2601 set to OFF (0).

"E" indicates an extension header flag. "S" indicates a sequence number flag that indicates whether or not a "sequence number" region is valid. The "sequence number" region represents a sequence number region used for managing the sequence of T-PDU data transferred for each GTP.

"PN" (N-PDU number flag) is a flag indicating whether or not an "N-PDU number" region is valid. The "N-PDU number" region is used during SGSN Routing Area Update procedures and during handover procedures with different systems.

"Message Type" indicates the GTP message type. "Length" indicates the pilot length of the packet added to the GTP header 2600. "Tunnel Endpoint Identifier" (TEID) is identification information of the IP tunnel established by the GTP.

As described above, network abnormality locations can be accurately identified using the disclosed technology. As a result, for example, a network operator can easily perform maintenance processing such as cutting off defective lines, switching, and adjusting equipment parameters. Moreover, suitable maintenance processing can be performed since network abnormality locations can be identified accurately even when the maintenance processing is performed automatically in the network. As a result, network performance can be performed reliably.

Moreover, abnormalities can be detected during service according to the technology disclosed herein since abnormalities can be detected using user data actually being transmitted. As a result, network abnormality locations can be identified while suppressing effects on the network and service in comparison to, for example, creating simulated signals to conduct testing.

Furthermore, abnormality locations can be identified with the disclosed technology by using a time from when a base station receives and then transmits user data, or a time from when one communication station transmits user data to when another communication station receives the user data. Therefore, according to the disclosed technology, abnormality locations in a network can be identified even when sequential control or authorization response is not conducted in the network. As a result, the disclosed technology may even be applicable to, for example, User Datagram Protocol (UDP).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A base station comprising:
    a baseband unit;
    a network interface device coupled to the baseband unit and configured to:
        receive user data and information associated with the user data,
        process the user data in accordance with the information, and
        transmit the user data; and
    a processor configured to perform a test for the network interface device based on a comparison of a period with a first set value when the information indicates that the test for the network interface device is to be performed, the period being from when the network interface device receives the user data to when the network interface device transmits the user data, wherein the period represents an internal processing time of the user data within the network interface device.

2. The base station according to claim 1, wherein the processor is further configured to determine respective periods of time of a plurality of user data processed by the network interface device for the test, and detect an abnormality based on a result of comparing the respective periods to at least a second set value.

3. The base station according to claim 1, wherein the processor is further configured to determine the first set value according to an average value of periods previously obtained by the processor.

4. The base station according to claim 1, wherein the processor is further configured to control the base station based on the result of the test.

5. A detection device communicable with a base station having a baseband unit and a network interface device, the network interface device being coupled to the baseband unit and configured to receive user data and information associated with the user data, process the user data in accordance with the information, and transmit the user data, the detection device comprising:
    a processor configured to control the detection device in accordance with a process comprising:
    performing a test for the network interface device based on a comparison of a period with a set value when the information indicates that the test for the network interface device is to be performed, the period being from when the network interface device receives the user data to when the network interface device transmits the user data, wherein the period represents an internal processing time of the user data within the network interface device;
    controlling at least one of the network interface device and the detection device based on a result of the test; and
    determining an abnormality based on the result of the test.

6. A communication system comprising:
    a base station including a baseband unit and a network interface device, the network interface device being coupled to the baseband unit and configured to receive user data and information associated with the user data, to process the user data in accordance with the information, and to transmit the user data; and
    a detection device including a processor configured to perform a test for the network interface device based on a comparison of a period with a set value when the information indicates that the test for the network interface device is to be performed, the period being from when the network interface device receives the user data to when the network interface device transmits the user data, wherein the period represents an internal processing time of the user data within the network interface device.

7. A method used in a base station having a baseband unit and a network interface device, the network interface device being coupled to the baseband unit and configured to receive user data and information associated with the user data, processing the user data in accordance with the information, and transmit the user data, the method comprising:
    performing a test for the network interface device based on a comparison of a period with a set value when the information indicates that the test for the network interface device is to be performed, the period being from when the network interface device receives the user data and to when the network interface device transmits the user data, wherein the period represents an internal processing time of the user data within the network interface device; and
    detecting an abnormality based on a result of the test.

8. The base station according to claim 1, wherein the information is included in a header for a communication protocol, and the header is associated with the user data.

9. The base station according to claim 8, wherein the communication protocol is GPRS Tunneling Protocol (GTP).

10. The base station according to claim 9, wherein the information is put in a reserved field of the header for GTP.

11. The base station according to claim 1, wherein the user data is not terminated by the base station.

12. The base station according to claim 1, wherein in performing the test, the processor is configured to determine an abnormality of the network interface device when the period is longer than a certain length of time.

13. The base station according to claim 1, wherein the processor is configured to not determine the period when the information does not indicate to perform the test for the network interface device.

14. The base station according to claim 1, further comprising:
a wireless network interface device configured to:
receive the user data and the information from the network interface device,
process the user data in accordance with the information, and
transmit the user data to a mobile station wirelessly, wherein:
the network interface device is further configured to receive the user data and the information from another apparatus via a network, and
the processor is further configured to perform another test for the wireless network interface device based on another period which is from when the wireless network interface device receives the user data and to when the wireless network interface device transmits the user data, when the information indicates that the test for the wireless network interface device is to be performed.

15. The base station according to claim 1, further comprising:
another network interface device configured to:
receive the user data and the information associated with the user data from a first apparatus via a network,
process the user data in accordance with the information, and
transmit the user data and the information to the network interface device,
wherein:
the network interface device is further configured to receive the user data and the information from the another network interface device and transmit the user data to a second apparatus; and
the processor is further configured to:
perform a second test for the other network interface device based on a comparison of a second period with another set value when the information indicates that the second test for the other network interface device is to be performed, the second period being from when the other network interface device receives the user data and to when the other network interface device transmits the user data, and
determine whether a delay has occurred in the network interface device or the other network interface device based on the test and the second test.

16. The base station according to claim 1, wherein the user data comprise data of a U-plane signal.

17. The base station according to claim 1, wherein the user data are provided in accordance with an Internet Protocol (IP) packet format, and wherein the user data are not terminated by the base station.

18. The base station according to claim 15, wherein the other network interface device is a baseband unit.

19. The base station according to claim 1, wherein the test for the network interface device is to detect presence of one or more abnormalities in operation of the network interface device.

* * * * *